(12) United States Patent
Knight et al.

(10) Patent No.: US 11,141,687 B2
(45) Date of Patent: Oct. 12, 2021

(54) FILTER WITH INTERLOCKING HOUSING INTERFACE

(71) Applicant: Cummins Filtration IP, Inc., Columbus, IN (US)

(72) Inventors: Jessie A. Knight, Oregon, WI (US); Scott G. Manke, Sun Prairie, WI (US); Dane P. Miller, Madison, WI (US); Jason A. Scherck, Madison, WI (US); Robert A. Bannister, Stoughton, WI (US); Gregory K. Loken, Stoughton, WI (US); Scott W. Schwartz, Cottage Grove, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 107 days.

(21) Appl. No.: 16/097,773

(22) PCT Filed: May 1, 2017

(86) PCT No.: PCT/US2017/030386
§ 371 (c)(1),
(2) Date: Oct. 30, 2018

(87) PCT Pub. No.: WO2017/192441
PCT Pub. Date: Nov. 9, 2017

(65) Prior Publication Data
US 2019/0168154 A1   Jun. 6, 2019

Related U.S. Application Data

(60) Provisional application No. 62/330,310, filed on May 2, 2016.

(51) Int. Cl.
*B01D 46/12* (2006.01)
*B01D 46/00* (2006.01)
(Continued)

(52) U.S. Cl.
CPC ....... *B01D 46/125* (2013.01); *B01D 46/0005* (2013.01); *F02M 35/0201* (2013.01);
(Continued)

(58) Field of Classification Search
CPC ...... B01D 29/05; B01D 35/30; B01D 35/301; B01D 35/303; B01D 46/0002;
(Continued)

(56) References Cited

U.S. PATENT DOCUMENTS 2,025,009 A   12/1935   Baker
2,093,877 A    9/1937   Pentz
(Continued)

FOREIGN PATENT DOCUMENTS

CN   1130539 A   9/1996
CN   1139884 A   1/1997
(Continued)

OTHER PUBLICATIONS

First Office Action for Chinese Patent App. No. 2016800710703 dated Nov. 26, 2019, 29 pages (with translation).
(Continued)

*Primary Examiner* — Minh Chau T Pham
(74) *Attorney, Agent, or Firm* — Foley & Lardner LLP

(57) ABSTRACT

A filter element includes first filter media, second filter media, a frame, and a seal member. The frame is coupled to the first filter media and the second filter media, the frame securing the first filter media and the second filter media into a V-shape. The seal member is attached to and extends from the frame. The seal member includes a U-shaped channel structured to receive a ridge of a housing when the filter element is installed in the housing. The seal member is structured to form a seal between the filter element and the housing when the filter element is installed in the housing.

25 Claims, 13 Drawing Sheets

(51) Int. Cl.
*F02M 35/024* (2006.01)
*F02M 35/02* (2006.01)

(52) U.S. Cl.
CPC .. *F02M 35/0202* (2013.01); *F02M 35/02416*
(2013.01); *F02M 35/02425* (2013.01); *F02M*
*35/02491* (2013.01); *B01D 2271/022*
(2013.01); *B01D 2271/027* (2013.01); *B01D*
*2279/60* (2013.01)

(58) Field of Classification Search
CPC ............ B01D 46/0004; B01D 46/0005; B01D
46/0006; B01D 46/0008; B01D 46/125;
B01D 46/24; B01D 46/2411; B01D
46/42; B01D 63/024; B01D 2201/4053;
B01D 2271/027; B01D 2271/022; B01D
2279/60; F02M 35/02; F02M 35/024;
F02M 35/08; F02M 35/10111; F02M
35/02425; F02M 35/0202; F02M
35/0201; F02M 35/02416; F02M
35/02491
USPC ...... 55/385.3, 498, 502, 521, 482, 483, 484;
210/493.1, 493.5
See application file for complete search history.

(56) References Cited

U.S. PATENT DOCUMENTS

| | | | |
|---|---|---|---|
| 2,270,969 A | 1/1942 | Robinson | |
| 2,306,325 A | 12/1942 | Allam | |
| 2,910,332 A | 10/1959 | Madsen | |
| 2,915,188 A | 12/1959 | Buker | |
| 2,955,028 A | 10/1960 | Bevans | |
| 3,025,963 A | 3/1962 | Bauer | |
| 3,224,592 A | 12/1965 | Burns | |
| 3,383,841 A * | 5/1968 | Olson | B01D 46/06 55/337 |
| 3,494,113 A | 2/1970 | Kinney | |
| 3,576,095 A * | 4/1971 | Rivers | B01D 46/125 55/484 |
| 3,582,095 A | 6/1971 | Bogaert | |
| 3,598,738 A | 8/1971 | Du Pont | |
| 3,645,402 A | 2/1972 | Alexander et al. | |
| 3,687,849 A | 8/1972 | Abbott | |
| 3,749,247 A | 7/1973 | Rohde | |
| 4,014,794 A | 3/1977 | Lewis | |
| 4,061,572 A | 12/1977 | Cohen et al. | |
| 4,066,559 A | 1/1978 | Rohde | |
| 4,075,097 A | 2/1978 | Paul | |
| 4,075,098 A | 2/1978 | Paul et al. | |
| 4,080,185 A | 3/1978 | Richter et al. | |
| 4,128,251 A | 12/1978 | Gaither et al. | |
| 4,129,429 A | 12/1978 | Humbert et al. | |
| 4,144,169 A | 3/1979 | Grueschow | |
| 4,181,313 A | 1/1980 | Hillier et al. | |
| 4,211,543 A | 7/1980 | Tokar et al. | |
| 4,257,890 A | 3/1981 | Hurner | |
| 4,300,928 A | 11/1981 | Sugie | |
| 4,324,213 A | 4/1982 | Kasting et al. | |
| 4,364,751 A | 12/1982 | Copley | |
| 4,402,912 A | 9/1983 | Krueger et al. | |
| 4,410,427 A | 10/1983 | Wydeven | |
| 4,473,471 A | 9/1984 | Robichaud et al. | |
| 4,572,522 A | 2/1986 | Smagatz | |
| 4,589,983 A | 5/1986 | Wydevan | |
| 4,600,420 A | 7/1986 | Wydeven et al. | |
| 4,617,122 A | 10/1986 | Kruse et al. | |
| 4,738,776 A | 4/1988 | Brown | |
| 4,755,289 A | 7/1988 | Villani | |
| 4,782,891 A | 11/1988 | Cheadle et al. | |
| 4,826,517 A | 5/1989 | Norman | |
| 4,861,359 A | 8/1989 | Tettman | |
| 4,865,636 A | 9/1989 | Raber | |
| 4,915,831 A | 4/1990 | Taylor | |
| 4,925,561 A | 5/1990 | Ishii et al. | |
| 4,951,834 A | 8/1990 | Aikins | |
| 4,979,969 A | 12/1990 | Herding | |
| 5,024,268 A | 6/1991 | Cheadle et al. | |
| 5,050,549 A | 9/1991 | Sturmon | |
| 5,069,799 A | 12/1991 | Brownawell et al. | |
| 5,071,456 A | 12/1991 | Binder et al. | |
| 5,094,745 A | 3/1992 | Reynolds | |
| 5,120,334 A | 6/1992 | Cooper | |
| 5,203,994 A | 4/1993 | Janik | |
| 5,213,596 A | 5/1993 | Kume et al. | |
| 5,222,488 A | 6/1993 | Forsgren | |
| 5,223,011 A | 6/1993 | Hanni | |
| 5,225,081 A | 7/1993 | Brownawell | |
| 5,228,891 A | 7/1993 | Adiletta | |
| 5,258,118 A | 11/1993 | Gouritin et al. | |
| 5,298,160 A | 3/1994 | Ayers et al. | |
| 5,302,284 A | 4/1994 | Zeiner et al. | |
| 5,342,511 A | 8/1994 | Brown et al. | |
| 5,382,355 A | 1/1995 | Arlozynski | |
| 5,391,212 A | 2/1995 | Ernst et al. | |
| 5,435,346 A | 7/1995 | Tregidgo et al. | |
| 5,459,074 A | 10/1995 | Muoni | |
| 5,472,379 A | 12/1995 | Andress et al. | |
| 5,472,463 A | 12/1995 | Herman et al. | |
| 5,484,466 A | 1/1996 | Brown et al. | |
| 5,494,497 A | 2/1996 | Lee | |
| 5,498,332 A | 3/1996 | Handtmann | |
| 5,512,074 A | 4/1996 | Hanni et al. | |
| 5,531,848 A | 7/1996 | Brinda et al. | |
| 5,556,542 A | 9/1996 | Berman et al. | |
| 5,560,330 A | 10/1996 | Andress et al. | |
| 5,562,825 A | 10/1996 | Yamada et al. | |
| 5,569,311 A | 10/1996 | Oda et al. | |
| 5,575,826 A | 11/1996 | Gillingham et al. | |
| 5,591,330 A | 1/1997 | Lefebvre | |
| 5,605,554 A | 2/1997 | Kennedy | |
| 5,662,799 A | 9/1997 | Hudgens et al. | |
| 5,672,399 A | 9/1997 | Kahlbaugh et al. | |
| 5,709,722 A | 1/1998 | Nagai et al. | |
| 5,720,790 A | 2/1998 | Kometani et al. | |
| 5,738,785 A | 4/1998 | Brown et al. | |
| 5,753,116 A | 5/1998 | Baumann et al. | |
| 5,753,117 A | 5/1998 | Jiang | |
| 5,759,217 A | 6/1998 | Joy | |
| 5,772,883 A | 6/1998 | Rothman et al. | |
| 5,793,566 A | 8/1998 | Scura et al. | |
| 5,795,361 A | 8/1998 | Lanier et al. | |
| 5,803,024 A | 9/1998 | Brown | |
| 5,820,646 A | 10/1998 | Gillingham et al. | |
| 5,830,371 A | 11/1998 | Smith et al. | |
| 5,853,439 A | 12/1998 | Gieseke et al. | |
| 5,863,424 A | 1/1999 | Lee | |
| 5,891,402 A | 4/1999 | Sassa et al. | |
| 5,893,939 A | 4/1999 | Rakocy et al. | |
| 5,902,364 A | 5/1999 | Tokar et al. | |
| 5,948,248 A | 9/1999 | Brown | |
| 5,985,143 A | 11/1999 | Lin | |
| 6,045,692 A | 4/2000 | Bilski et al. | |
| D425,189 S | 5/2000 | Gillingham et al. | |
| 6,086,763 A | 7/2000 | Baumann | |
| 6,096,208 A | 8/2000 | Connelly et al. | |
| 6,098,575 A | 8/2000 | Mulshine et al. | |
| 6,099,612 A | 8/2000 | Bartos | |
| 6,117,202 A | 9/2000 | Wetzel | |
| 6,123,746 A | 9/2000 | Alvin et al. | |
| 6,129,852 A | 10/2000 | Elliott et al. | |
| 6,149,700 A | 11/2000 | Morgan et al. | |
| 6,171,355 B1 | 1/2001 | Gieseke et al. | |
| 6,179,890 B1 | 1/2001 | Ramos et al. | |
| D437,402 S | 2/2001 | Gieseke et al. | |
| 6,190,432 B1 | 2/2001 | Gieseke et al. | |
| 6,196,019 B1 | 3/2001 | Higo et al. | |
| 6,217,627 B1 | 4/2001 | Vyskocil et al. | |
| 6,231,630 B1 | 5/2001 | Ernst et al. | |
| 6,235,194 B1 | 5/2001 | Jousset | |
| 6,235,195 B1 | 5/2001 | Tokar | |
| 6,238,554 B1 | 5/2001 | Martin et al. | |
| 6,238,561 B1 | 5/2001 | Liu et al. | |

(56) References Cited

U.S. PATENT DOCUMENTS

| | | |
|---|---|---|
| 6,261,334 B1 | 7/2001 | Morgan et al. |
| 6,264,831 B1 | 7/2001 | Hawkins et al. |
| 6,264,833 B1 | 7/2001 | Reamsnyder et al. |
| RE37,369 E | 9/2001 | Hudgens et al. |
| 6,293,984 B1 | 9/2001 | Oda et al. |
| 6,306,193 B1 | 10/2001 | Morgan et al. |
| D450,828 S | 11/2001 | Tokar |
| 6,348,085 B1 | 2/2002 | Tokar et al. |
| D455,826 S | 4/2002 | Gillingham et al. |
| 6,375,700 B1 | 4/2002 | Jaroszczyk et al. |
| 6,379,564 B1 | 4/2002 | Rohrbach et al. |
| 6,391,076 B1 | 5/2002 | Jaroszczyk et al. |
| 6,398,832 B2 | 6/2002 | Morgan et al. |
| 6,402,798 B1 | 6/2002 | Kallsen et al. |
| 6,416,561 B1 | 7/2002 | Kallsen et al. |
| 6,447,566 B1* | 9/2002 | Rivera ............... B01D 46/0005 55/482 |
| 6,475,379 B2 | 11/2002 | Jousset et al. |
| 6,478,018 B2 | 11/2002 | Fedorowicz et al. |
| 6,478,019 B2 | 11/2002 | Fedorowicz et al. |
| 6,478,958 B1 | 11/2002 | Beard et al. |
| 6,482,247 B2 | 11/2002 | Jaroszczyk et al. |
| 6,511,599 B2 | 1/2003 | Jaroszczyk et al. |
| 6,517,598 B2 | 2/2003 | Anderson et al. |
| 6,537,453 B2 | 3/2003 | Beard et al. |
| D473,637 S | 4/2003 | Golden |
| 6,547,857 B2 | 4/2003 | Gieseke et al. |
| 6,554,139 B1 | 4/2003 | Maxwell et al. |
| 6,571,962 B2 | 6/2003 | Thomas |
| 6,596,165 B2 | 7/2003 | Koivula |
| 6,610,126 B2 | 8/2003 | Xu et al. |
| 6,623,636 B2 | 9/2003 | Rohrbach et al. |
| 6,641,637 B2 | 11/2003 | Kallsen et al. |
| 6,673,136 B2 | 1/2004 | Gillingham et al. |
| 6,676,721 B1 | 1/2004 | Gillingham et al. |
| 6,709,588 B2 | 3/2004 | Pavlin et al. |
| 6,740,234 B1 | 5/2004 | Williams et al. |
| 6,743,317 B2 | 6/2004 | Wydeven |
| 6,746,518 B2 | 6/2004 | Gieseke et al. |
| 6,787,033 B2 | 9/2004 | Beard et al. |
| 6,823,996 B2 | 11/2004 | Durre |
| 6,827,750 B2 | 12/2004 | Drozd et al. |
| 6,835,304 B2 | 12/2004 | Jousset et al. |
| 6,837,920 B2 | 1/2005 | Gieseke et al. |
| 6,843,916 B2 | 1/2005 | Burrington et al. |
| 6,860,241 B2 | 3/2005 | Martin et al. |
| 6,893,571 B2 | 5/2005 | Harenbrock et al. |
| 6,902,598 B2 | 6/2005 | Gunderson et al. |
| 6,919,023 B2 | 7/2005 | Merritt et al. |
| 6,922,894 B2 | 8/2005 | Durre |
| 6,939,464 B1 | 9/2005 | Jiang et al. |
| 6,953,124 B2 | 10/2005 | Winter et al. |
| 6,966,940 B2 | 11/2005 | Krisko et al. |
| 6,969,461 B2 | 11/2005 | Beard et al. |
| 6,984,319 B2 | 1/2006 | Merritt et al. |
| 6,996,940 B2 | 2/2006 | Beasley |
| 6,998,045 B2 | 2/2006 | Durre |
| 7,001,450 B2 | 2/2006 | Gieseke et al. |
| 7,008,467 B2 | 3/2006 | Krisko et al. |
| 7,018,531 B2 | 3/2006 | Eilers et al. |
| 7,048,501 B2* | 5/2006 | Katayama ............ B01D 46/521 415/121.2 |
| 7,070,641 B1 | 7/2006 | Gunderson et al. |
| 7,081,145 B2 | 7/2006 | Gieseke et al. |
| 7,090,711 B2 | 8/2006 | Gillingham et al. |
| 7,153,422 B2 | 12/2006 | Herman et al. |
| 7,156,991 B2 | 1/2007 | Herman et al. |
| 7,160,451 B2 | 1/2007 | Hacker et al. |
| 7,182,863 B2 | 2/2007 | Eilers et al. |
| 7,182,864 B2 | 2/2007 | Brown et al. |
| 7,211,124 B2 | 5/2007 | Gieseke et al. |
| 7,217,361 B2 | 5/2007 | Connor et al. |
| 7,237,682 B2 | 7/2007 | Reynolds et al. |
| 7,247,183 B2 | 7/2007 | Connor et al. |
| 7,258,719 B2 | 8/2007 | Miller et al. |
| 7,282,075 B2 | 10/2007 | Sporre et al. |
| 7,311,747 B2* | 12/2007 | Adamek ............... B01D 29/21 55/498 |
| 7,338,544 B2 | 3/2008 | Sporre et al. |
| 7,344,582 B2 | 3/2008 | Pearson et al. |
| 7,351,270 B2 | 4/2008 | Engelland et al. |
| 7,396,375 B2 | 7/2008 | Nepsund et al. |
| 7,425,226 B2* | 9/2008 | Powell ................ B01D 46/10 210/493.5 |
| 7,491,254 B2 | 2/2009 | Krisko et al. |
| 7,494,017 B2 | 2/2009 | Miller |
| 7,524,416 B1 | 4/2009 | Bergmen |
| 7,540,895 B2 | 6/2009 | Furseth et al. |
| D600,790 S | 9/2009 | Nelson et al. |
| 7,582,130 B2 | 9/2009 | Ng et al. |
| 7,614,504 B2 | 11/2009 | South et al. |
| 7,625,419 B2 | 12/2009 | Nelson et al. |
| 7,645,310 B2 | 1/2010 | Krisko et al. |
| 7,655,074 B2 | 2/2010 | Nepsund et al. |
| 7,662,216 B1 | 2/2010 | Terres et al. |
| 7,674,308 B2 | 3/2010 | Krisko et al. |
| 7,682,416 B2 | 3/2010 | Engelland et al. |
| 7,731,753 B2 | 6/2010 | Reo et al. |
| 7,776,139 B2 | 8/2010 | Schwandt et al. |
| 7,799,108 B2 | 9/2010 | Connor et al. |
| 7,828,869 B1 | 11/2010 | Parikh et al. |
| 7,882,961 B2 | 2/2011 | Menez et al. |
| 7,931,723 B2* | 4/2011 | Cuvelier ............. B01D 46/002 55/484 |
| 7,959,714 B2 | 6/2011 | Smith et al. |
| 7,967,886 B2 | 6/2011 | Schrage et al. |
| 7,972,405 B2 | 7/2011 | Engelland et al. |
| 7,981,183 B2 | 7/2011 | Nepsund et al. |
| 7,993,422 B2 | 8/2011 | Krisko et al. |
| 8,016,903 B2 | 9/2011 | Nelson et al. |
| 8,034,145 B2 | 10/2011 | Boehrs et al. |
| 8,043,504 B2 | 10/2011 | Malgorn |
| 8,048,187 B2 | 11/2011 | Merritt et al. |
| 8,061,530 B2 | 11/2011 | Kindkeppel et al. |
| 8,062,399 B2 | 11/2011 | Nelson et al. |
| 8,096,423 B2 | 1/2012 | Menez et al. |
| 8,097,061 B2 | 1/2012 | Smith et al. |
| 8,101,003 B2 | 1/2012 | Krisko et al. |
| 8,119,002 B2 | 2/2012 | Schiavon et al. |
| 8,146,751 B2 | 4/2012 | Hawkins et al. |
| 8,167,966 B2 | 5/2012 | Amirkhanian et al. |
| 8,177,967 B2 | 5/2012 | Bagci et al. |
| 8,216,470 B2 | 7/2012 | Abdalla et al. |
| 8,220,640 B2 | 7/2012 | Schmitz et al. |
| 8,241,383 B2 | 8/2012 | Schrage et al. |
| 8,276,763 B2 | 10/2012 | Shaam |
| 8,277,532 B2 | 10/2012 | Reichter et al. |
| 8,292,983 B2 | 10/2012 | Reichter et al. |
| 8,328,897 B2 | 12/2012 | Nelson et al. |
| 8,333,890 B2 | 12/2012 | Wells et al. |
| 8,348,064 B2 | 1/2013 | Tandon |
| 8,357,219 B2 | 1/2013 | Boehrs et al. |
| 8,419,938 B2 | 4/2013 | Ries et al. |
| 8,430,657 B2 | 4/2013 | Simonelli et al. |
| 8,440,081 B2 | 5/2013 | Wieczorek |
| 8,480,779 B2 | 7/2013 | Boehrs et al. |
| 8,496,723 B2 | 7/2013 | Reichter et al. |
| 8,501,001 B2 | 8/2013 | Curt et al. |
| 8,506,666 B2 | 8/2013 | Haslebacher |
| 8,518,141 B2 | 8/2013 | Schrage et al. |
| 8,544,158 B2 | 10/2013 | Curt et al. |
| 8,550,656 B2 | 10/2013 | McCarthy et al. |
| 8,562,707 B2 | 10/2013 | Nepsund et al. |
| 8,636,820 B2 | 1/2014 | Reichter et al. |
| 8,652,228 B2 | 2/2014 | Krisko et al. |
| 8,709,119 B2 | 4/2014 | Reichter et al. |
| 8,714,565 B1 | 5/2014 | Cornett et al. |
| 8,753,414 B2* | 6/2014 | Gebert ............... B01D 46/0005 55/483 |
| 8,778,043 B2 | 7/2014 | Krisko et al. |
| 8,840,699 B2 | 9/2014 | Bruce et al. |
| 8,845,897 B2 | 9/2014 | Wieczorek et al. |
| 8,852,308 B2* | 10/2014 | Jarrier ................ B01D 46/521 55/484 |

(56) References Cited

U.S. PATENT DOCUMENTS

| | | | |
|---|---|---|---|
| 8,906,128 B2 | 12/2014 | Reichter et al. | |
| 8,911,498 B2 | 12/2014 | Bartish et al. | |
| 8,926,725 B2* | 1/2015 | Loken | B01D 46/125 55/484 |
| 8,932,465 B2 | 1/2015 | Wells et al. | |
| 9,101,883 B2 | 8/2015 | Pugh et al. | |
| 9,114,346 B2 | 8/2015 | Schrage et al. | |
| 9,211,488 B2 | 12/2015 | South et al. | |
| 9,308,476 B2 | 4/2016 | Martin et al. | |
| 9,320,997 B2 | 4/2016 | Campbell et al. | |
| 9,409,107 B2 | 8/2016 | Arakeri et al. | |
| 9,415,333 B2 | 8/2016 | Kindkeppel et al. | |
| 9,782,706 B1 | 10/2017 | Levy | |
| 9,782,708 B2 | 10/2017 | Kindkeppel et al. | |
| 10,729,999 B2 | 8/2020 | Nichols et al. | |
| 10,744,443 B2* | 8/2020 | Silvestro | B01D 46/125 |
| 10,835,852 B2 | 11/2020 | Decoster et al. | |
| 2001/0032545 A1 | 10/2001 | Goto et al. | |
| 2002/0046556 A1 | 4/2002 | Reid | |
| 2002/0060178 A1 | 5/2002 | Tsabari | |
| 2002/0073850 A1 | 6/2002 | Tokar et al. | |
| 2002/0096247 A1 | 7/2002 | Wydeven | |
| 2002/0157359 A1 | 10/2002 | Stenersen et al. | |
| 2002/0170280 A1 | 11/2002 | Soh | |
| 2002/0185007 A1 | 12/2002 | Xu et al. | |
| 2002/0185454 A1 | 12/2002 | Beard et al. | |
| 2002/0195384 A1 | 12/2002 | Rohrbach et al. | |
| 2003/0121845 A1 | 7/2003 | Wagner et al. | |
| 2003/0154863 A1 | 8/2003 | Tokar et al. | |
| 2003/0184025 A1 | 10/2003 | Matsuki | |
| 2003/0218150 A1 | 11/2003 | Blakemore et al. | |
| 2004/0035097 A1 | 2/2004 | Schlensker et al. | |
| 2004/0040271 A1 | 3/2004 | Kopec et al. | |
| 2004/0060861 A1 | 4/2004 | Winter et al. | |
| 2004/0091652 A1 | 5/2004 | Kikuchi et al. | |
| 2004/0091654 A1 | 5/2004 | Kelly et al. | |
| 2004/0140255 A1 | 7/2004 | Merritt et al. | |
| 2004/0173097 A1 | 9/2004 | Engelland et al. | |
| 2004/0187689 A1 | 9/2004 | Sporre et al. | |
| 2004/0221555 A1 | 11/2004 | Engelland et al. | |
| 2004/0226443 A1 | 11/2004 | Gillingham et al. | |
| 2005/0019236 A1 | 1/2005 | Martin et al. | |
| 2005/0024061 A1 | 2/2005 | Cox et al. | |
| 2005/0166561 A1 | 8/2005 | Schrage et al. | |
| 2005/0173325 A1 | 8/2005 | Klein et al. | |
| 2005/0193695 A1 | 9/2005 | Holmes et al. | |
| 2005/0194312 A1 | 9/2005 | Niemeyer et al. | |
| 2005/0224061 A1 | 10/2005 | Ulrich et al. | |
| 2005/0252848 A1 | 11/2005 | Miller | |
| 2006/0064956 A1 | 3/2006 | Connor et al. | |
| 2006/0113233 A1 | 6/2006 | Merritt et al. | |
| 2006/0118474 A1 | 6/2006 | Kolczyk et al. | |
| 2006/0180537 A1 | 8/2006 | Loftis et al. | |
| 2006/0213139 A1 | 9/2006 | Stramandinoli | |
| 2007/0037428 A1 | 2/2007 | Annecke | |
| 2007/0095744 A1 | 5/2007 | Bagci et al. | |
| 2007/0175815 A1 | 8/2007 | Thomas | |
| 2007/0240392 A1 | 10/2007 | Ng et al. | |
| 2007/0261374 A1 | 11/2007 | Nelson et al. | |
| 2007/0267338 A1 | 11/2007 | Menez et al. | |
| 2008/0011672 A1* | 1/2008 | Schwartz | B01D 46/2411 210/493.1 |
| 2008/0022641 A1 | 1/2008 | Engelland et al. | |
| 2008/0035587 A1 | 2/2008 | Wieczorek et al. | |
| 2008/0047132 A1 | 2/2008 | Wieczorek | |
| 2008/0087589 A1 | 4/2008 | Grzonka et al. | |
| 2008/0107765 A1 | 5/2008 | Considine et al. | |
| 2008/0110142 A1 | 5/2008 | Nelson et al. | |
| 2008/0179263 A1 | 7/2008 | Wieczorek et al. | |
| 2008/0237113 A1 | 10/2008 | Jensen | |
| 2008/0250766 A1 | 10/2008 | Schrage et al. | |
| 2008/0307759 A1 | 12/2008 | Reichter et al. | |
| 2008/0308481 A1 | 12/2008 | Wieczorek et al. | |
| 2009/0014381 A1 | 1/2009 | South et al. | |
| 2009/0026124 A1 | 1/2009 | Schmitz et al. | |
| 2009/0050554 A1 | 2/2009 | Shaam | |
| 2009/0057213 A1 | 3/2009 | Schiavon et al. | |
| 2009/0057219 A1 | 3/2009 | Bagci et al. | |
| 2009/0064646 A1 | 3/2009 | Reichter et al. | |
| 2009/0071892 A1 | 3/2009 | Malgorn | |
| 2009/0090669 A1 | 4/2009 | Holzmann et al. | |
| 2009/0095669 A1 | 4/2009 | South | |
| 2009/0126324 A1 | 5/2009 | Smith et al. | |
| 2009/0135590 A1 | 5/2009 | McCarthy et al. | |
| 2009/0151311 A1 | 6/2009 | Reichter et al. | |
| 2009/0193972 A1 | 8/2009 | Schwandt et al. | |
| 2009/0241315 A1 | 10/2009 | Menez et al. | |
| 2009/0242475 A2 | 10/2009 | Menez et al. | |
| 2009/0249754 A1 | 10/2009 | Amirkhanian et al. | |
| 2009/0326657 A1 | 12/2009 | Grinberg et al. | |
| 2010/0001477 A1 | 1/2010 | Eyers et al. | |
| 2010/0043366 A1 | 2/2010 | Boehrs et al. | |
| 2010/0051528 A1 | 3/2010 | Derstler et al. | |
| 2010/0064646 A1 | 3/2010 | Smith et al. | |
| 2010/0065203 A1 | 3/2010 | Tanbour et al. | |
| 2010/0077710 A1 | 4/2010 | Severance et al. | |
| 2010/0101993 A1 | 4/2010 | Wells et al. | |
| 2010/0108590 A1 | 5/2010 | Curt et al. | |
| 2010/0114318 A1 | 5/2010 | Gittings et al. | |
| 2010/0126919 A1 | 5/2010 | Hawkins et al. | |
| 2010/0150764 A1 | 6/2010 | Simonelli et al. | |
| 2010/0170209 A1 | 7/2010 | Nelson et al. | |
| 2010/0176047 A1 | 7/2010 | Bagci et al. | |
| 2010/0186353 A1 | 7/2010 | Ackermann et al. | |
| 2010/0200490 A1 | 8/2010 | Martin et al. | |
| 2010/0258493 A1 | 10/2010 | Kindkeppel et al. | |
| 2010/0263339 A1 | 10/2010 | Steins et al. | |
| 2010/0294707 A1 | 11/2010 | Abdalla et al. | |
| 2010/0294712 A1 | 11/2010 | Abdalla et al. | |
| 2011/0089104 A1 | 4/2011 | Menez et al. | |
| 2011/0132829 A1 | 6/2011 | Tucker et al. | |
| 2011/0197556 A1 | 8/2011 | Brown et al. | |
| 2011/0203099 A1 | 8/2011 | Curt et al. | |
| 2011/0260413 A1 | 10/2011 | Voltenburg et al. | |
| 2011/0303604 A1 | 12/2011 | McKenzie | |
| 2012/0031059 A1 | 2/2012 | Haslebacher | |
| 2012/0055127 A1* | 3/2012 | Holzmann | B01D 29/111 55/484 |
| 2012/0061307 A1 | 3/2012 | Kindkeppel et al. | |
| 2012/0223008 A1* | 9/2012 | Mbadinga-Mouanda | B01D 46/523 210/493.5 |
| 2013/0015119 A1 | 1/2013 | Pugh et al. | |
| 2013/0087497 A1 | 4/2013 | Wells et al. | |
| 2013/0220914 A1 | 8/2013 | Hawkins et al. | |
| 2013/0291502 A1 | 11/2013 | Gorman | |
| 2013/0327696 A1 | 12/2013 | Bagci et al. | |
| 2014/0027366 A1 | 1/2014 | Hawkins et al. | |
| 2014/0034565 A1* | 2/2014 | Loken | B01D 46/125 210/232 |
| 2014/0034566 A1 | 2/2014 | Verdegan et al. | |
| 2014/0048468 A1 | 2/2014 | Kindkeppel et al. | |
| 2014/0071669 A1 | 3/2014 | McCarthy et al. | |
| 2014/0096493 A1* | 4/2014 | Kelmartin | B01D 46/002 55/482 |
| 2014/0151275 A1 | 6/2014 | Bradford et al. | |
| 2014/0251895 A1 | 9/2014 | Wagner | |
| 2014/0260143 A1* | 9/2014 | Kaiser | B01D 46/10 55/501 |
| 2014/0290194 A1 | 10/2014 | Muenkel et al. | |
| 2014/0318090 A1 | 10/2014 | Rieger et al. | |
| 2015/0013289 A1 | 1/2015 | Hasenfratz et al. | |
| 2015/0013293 A1* | 1/2015 | Wagner | B01D 46/0005 55/502 |
| 2015/0033684 A1 | 2/2015 | Pettersson | |
| 2015/0060351 A1 | 3/2015 | Kaufmann et al. | |
| 2015/0061307 A1 | 3/2015 | Nakanishi | |
| 2015/0096273 A1* | 4/2015 | Kaiser | B01D 46/10 55/502 |
| 2015/0096932 A1 | 4/2015 | Hou et al. | |
| 2015/0176544 A1 | 6/2015 | Kaufmann et al. | |
| 2015/0202556 A1 | 7/2015 | Hawkins et al. | |
| 2015/0231532 A1 | 8/2015 | Pugh et al. | |

(56) References Cited

U.S. PATENT DOCUMENTS

| | | | |
|---|---|---|---|
| 2015/0285381 A1 | 10/2015 | Preston et al. | |
| 2016/0023142 A1 | 1/2016 | Arakeri et al. | |
| 2016/0045848 A1 | 2/2016 | Campbell et al. | |
| 2016/0059172 A1* | 3/2016 | Allott | B01D 46/0005 55/502 |
| 2016/0082372 A1 | 3/2016 | South et al. | |
| 2016/0160816 A1 | 6/2016 | Venkatraman et al. | |
| 2016/0169391 A1 | 6/2016 | Emig et al. | |
| 2016/0222931 A1 | 8/2016 | Jiang et al. | |
| 2016/0228798 A1 | 8/2016 | Page et al. | |
| 2016/0258397 A1 | 9/2016 | Jiang et al. | |
| 2016/0332103 A1 | 11/2016 | Marks et al. | |
| 2017/0078852 A1 | 3/2017 | Tan et al. | |
| 2018/0318745 A1 | 11/2018 | Nichols et al. | |
| 2020/0324237 A1 | 10/2020 | Moers et al. | |

FOREIGN PATENT DOCUMENTS

| | | | |
|---|---|---|---|
| CN | 1193288 A | 9/1998 | |
| CN | 2296402 | 11/1998 | |
| CN | 1486213 | 3/2004 | |
| CN | 1590746 | 3/2005 | |
| CN | 2372041 | 4/2005 | |
| CN | 1754612 A | 4/2006 | |
| CN | 101084050 | 12/2007 | |
| CN | 101374582 A | 2/2009 | |
| CN | 201292900 | 8/2009 | |
| CN | 101695616 | 4/2010 | |
| CN | 102083510 A | 6/2011 | |
| CN | 102271780 | 12/2011 | |
| CN | 202746046 | 2/2013 | |
| CN | 103977647 | 8/2014 | |
| CN | 104220142 | 12/2014 | |
| CN | 105688498 A | 6/2016 | |
| CN | 106102858 A | 11/2016 | |
| DE | 88 08 632 | 9/1988 | |
| DE | 29613098 | 9/1996 | |
| DE | 10 2008 062 956 | 6/2010 | |
| EP | 0 718 021 A | 6/1996 | |
| EP | 0 747 579 | 12/1996 | |
| EP | 0 982 062 | 3/2000 | |
| EP | WO 00/74818 A1 * | 12/2000 | B01D 46/24 |
| EP | 1 129 760 | 9/2001 | |
| EP | 1 166 843 A1 | 1/2002 | |
| EP | 1 208 902 A1 | 5/2002 | |
| EP | 1 233 173 | 8/2002 | |
| EP | 1 693 096 A2 | 8/2006 | |
| EP | 1 693 096 B1 | 8/2006 | |
| EP | 1 747 053 | 1/2007 | |
| EP | 3 370 849 | 9/2018 | |
| FR | 2214505 | 8/1974 | |
| GB | 0 970 826 | 9/1964 | |
| GB | 2 082 932 | 3/1982 | |
| GB | 2 404 348 | 2/2005 | |
| JP | 60-112320 | 6/1985 | |
| JP | 01-163408 | 6/1989 | |
| JP | 01-171615 | 7/1989 | |
| JP | 02-025009 | 1/1990 | |
| WO | WO-00/50152 | 8/2000 | |
| WO | WO-01/05485 A1 | 1/2001 | |
| WO | WO-2004/054684 A1 | 7/2004 | |
| WO | WO-2005/058461 A1 | 6/2005 | |
| WO | WO-2005/077487 A1 | 8/2005 | |
| WO | WO-2006/093981 A2 | 9/2006 | |
| WO | WO-2007/009039 A1 | 1/2007 | |
| WO | WO-2007/089662 | 8/2007 | |
| WO | WO-2012/153430 A1 | 11/2012 | |
| WO | WO-2017/079191 A1 | 5/2017 | |
| WO | WO-2017/120113 A1 | 7/2017 | |

OTHER PUBLICATIONS

International Search Report and Written Opinion for PCT/US2018/018696, dated Apr. 19, 2018, 8 pages.
Non-Final Office Action from U.S. Appl. No. 15/781,585, dated Jul. 2, 2020.
Chinese Office Action from corresponding Chinese Application No. 201080004417.5, dated Mar. 5, 2014, pp. 1-26.
Chinese Office Action from corresponding Chinese Application No. 201080004417.5, dated May 24, 2013, pp. 1-9.
First Office Action issued for German Patent Application No. 11 2010 001 567.8, including English language translation, dated May 18, 2017, 6 pages.
International Search Report and Written Opinion from corresponding PCT Application No. PCT/US2017/030386, dated Jul. 26, 2017, pp. 1-15.
International Search Report and Written Opinion issued for PCT/US2016/063053, dated Feb. 16, 2017, 8 pages.
International Search Report and Written Opinion issued for PCT/US2017/021615, dated Jun. 6, 2017, 8 pages.
International Search Report and Written Opinion issued for PCT/US2017/030386, dated Jul. 26, 2017, 9 pages.
Office Action from corresponding German Patent Application No. 112010001567.8, dated May 18, 2017, pp. 1-6.
Akro-Mils, "Nest & Stack Totes," retrieved from http://web.archive.org/web/20150323114331/https://akro-mils.com/produts/types/plastic-storage-containers/nest-stack-totes, 1 page (2015).
Non-Final Office Action on U.S. Appl. No. 16/083,945 dated Nov. 10, 2020.
U.S. Office Action on U.S. Appl. No. 15/781,585 dated Nov. 5, 2020.
First Office Action issued for Chinese Patent Application No. CN201880018033.5 dated Dec. 24, 2020, 10 pages.
Notice of Allowance issued for U.S. Appl. No. 15/781,585, dated Feb. 3, 2021, 23 pages.
First Examination Report for Indian Patent App. No. 202047056950 dated Mar. 24, 2021, 5 pages.
First Office Action for Chinese Patent App. No. 201880012627.5 dated Dec. 12, 2020, 22 pages (with English translation).
First Office Action for Chinese Patent Application No. 201880007980.4 dated Jan. 12, 2021, 15 pages (with English translation).
International Search Report & Written Opinion for PCT/US2018/014401 dated May 15, 2018, 9 pages.
International Search Report & Written Opinion for PCT/US2018/018724 dated Apr. 24, 2018, 13 pages.
International Search Report and Written Opinion for PCT/IB2019/056208 dated Nov. 11, 2019, 8 pages.

* cited by examiner

FILTER WITH INTERLOCKING HOUSING INTERFACE

CROSS-REFERENCE TO RELATED APPLICATIONS

The present application is a national stage of PCT Application No. PCT/US2017/030386, file May 1, 2017, which claims the benefit of priority to U.S. Provisional Patent Application No. 62/330,310, filed May 2, 2016. The contents of both applications hereby incorporated by reference in their entirety and for all purposes.

TECHNICAL FIELD

The present application relates to filter elements for use with filtration systems.

BACKGROUND

Internal combustion engines generally combust a mixture of fuel (e.g., gasoline, diesel, natural gas, etc.) and air. Prior to entering the engine, intake air is typically passed through a filter element to remove contaminants (e.g., particulates, dust, water, etc.) from the intake air prior to delivery to the engine. The filter element requires periodic replacement as the filter media of the filter element captures and removes particulate from the intake air passing through the filter media. Accordingly, the filter element is typically removably received in the housing such that when the filter element is installed, a seal is formed between the filter element and the housing preventing bypass of the intake air around the filter element. The use of a non-authorized filter element in a filtration system may lead to a poor seal or no seal thereby allowing intake air to bypass the filter element, which can damage the internal combustion engine.

SUMMARY

Various example embodiments relate to filter elements. One such filter element includes first filter media and second filter media. The filter element further includes a frame member coupled to the first filter media and the second filter media. The frame member secures the first filter media and the second filter media (such as into a V-shape). The filter element includes a seal member is attached to and extends from the frame member. The seal member includes a U-shaped channel structured to receive a ridge of a housing when the filter element is installed in the housing. The seal member is structured to form a seal between the filter element and the housing when the filter element is installed in the housing.

In an embodiment, a filter element includes first filter media, second filter media, a frame, and a seal member. The frame is coupled to the first filter media and the second filter media, the frame securing the first filter media and the second filter media. The seal member is attached to and extends from the frame. The seal member includes a U-shaped channel structured to receive a ridge of a housing when the filter element is installed in the housing. The seal member is structured to form a seal between the filter element and the housing when the filter element is installed in the housing.

In another embodiment, a filtration system includes a housing and a filter element. The housing includes a keyway. The filter element is positioned within the housing. The filter element includes first filter media, second filter media, and a frame. The frame is coupled to the first filter media and the second filter media. The frame secures the first filter media and the second filter media. The keyway interfaces with the filter element to facilitate positioning of the filter element within the housing.

In still another embodiment, a filter element includes first filter media, second filter media, and a frame. The frame is coupled to the first filter media and the second filter media. The frame secures the first filter media and the second filter media. The frame includes a first frame member, a second frame member, a first side wall, and a second side wall. The first frame member is coupled to a first end of the first filter media and a first end of the second filter media. The second frame member is coupled to a second end of the first filter media, opposite the first end of the first filter media, and a second end of the second filter media, opposite the first end of the second filter media. The first side wall is positioned along a first side of the first filter media and a first side of the second filter media. The first side wall is coupled to the first frame member and the second frame member. The second side wall is positioned along a second side of the first filter media, opposite the first side of the first filter media, and a second side of the second filter media, opposite the first side of the second filter media.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, a filtration system having a filter element removably received in a housing is shown. In some arrangements, the filter element includes two panel filters coupled to a frame that secure the panel filters in a V-shape such that a cross-section of the filter element has a V-shape. In other arrangements, the filter element includes filter media arranged in an alternate shape, such as a rectangular panel, a cylindrical shape, or the like. The filter media comprising the filter element may be pleated or non-pleated. The filter element includes a seal having an alignment channel. The housing includes an alignment rib that is received in the alignment channel of the filter element when the filter element is installed in the housing. A cover is removably secured to the housing. When the cover is secured to the housing and the filter element is installed in the housing, the cover compresses the seal member against the housing forming an axial seal between the housing and the filter element. In some arrangements, the seal member does not form a radial seal against the housing. In other arrangements, the seal member forms only a radial seal or a combination of a radial and axial seal.

Figure 1:
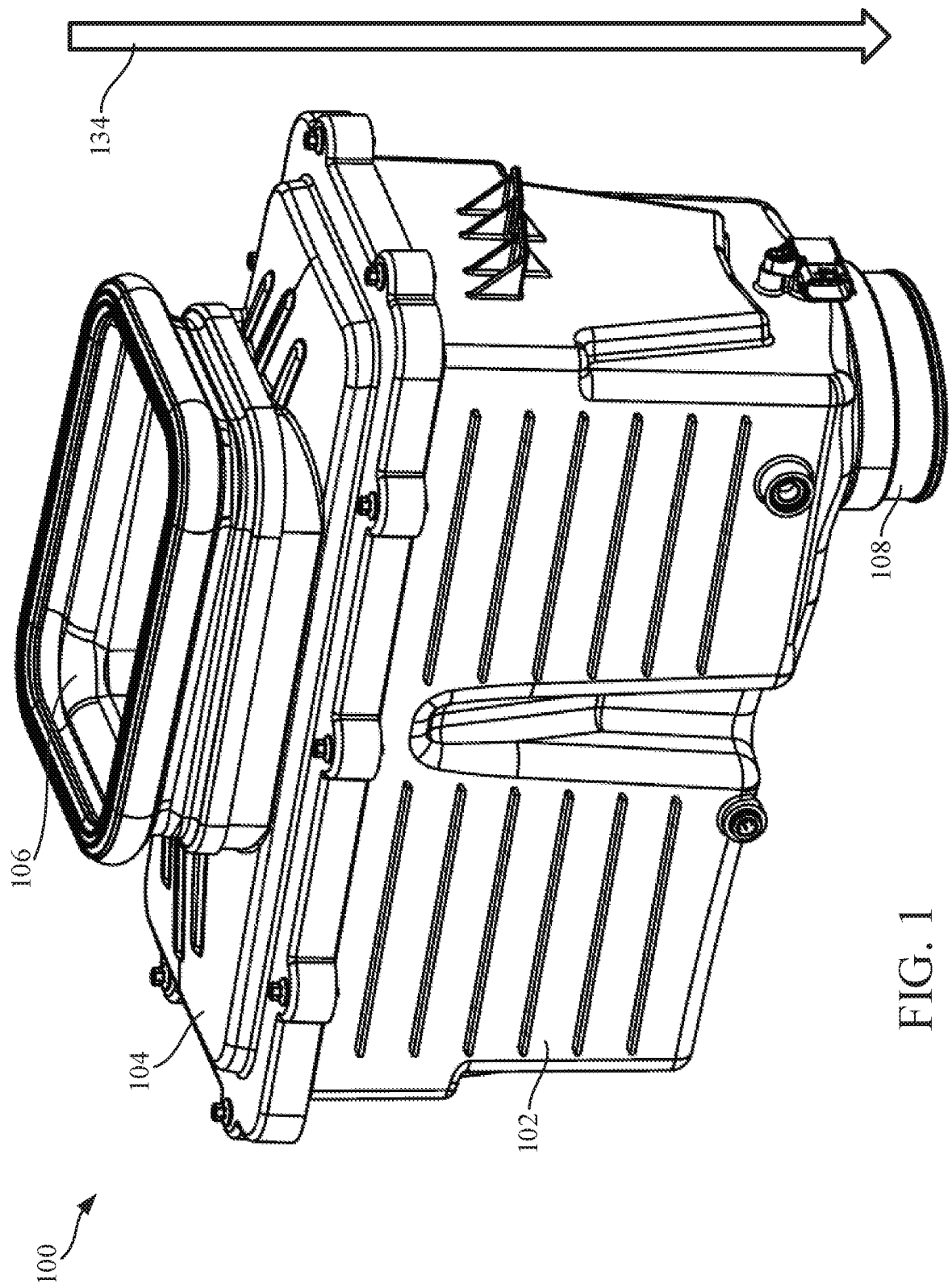
FIG. 1 shows a perspective view of a filtration system according to an example embodiment.
Figure 2:
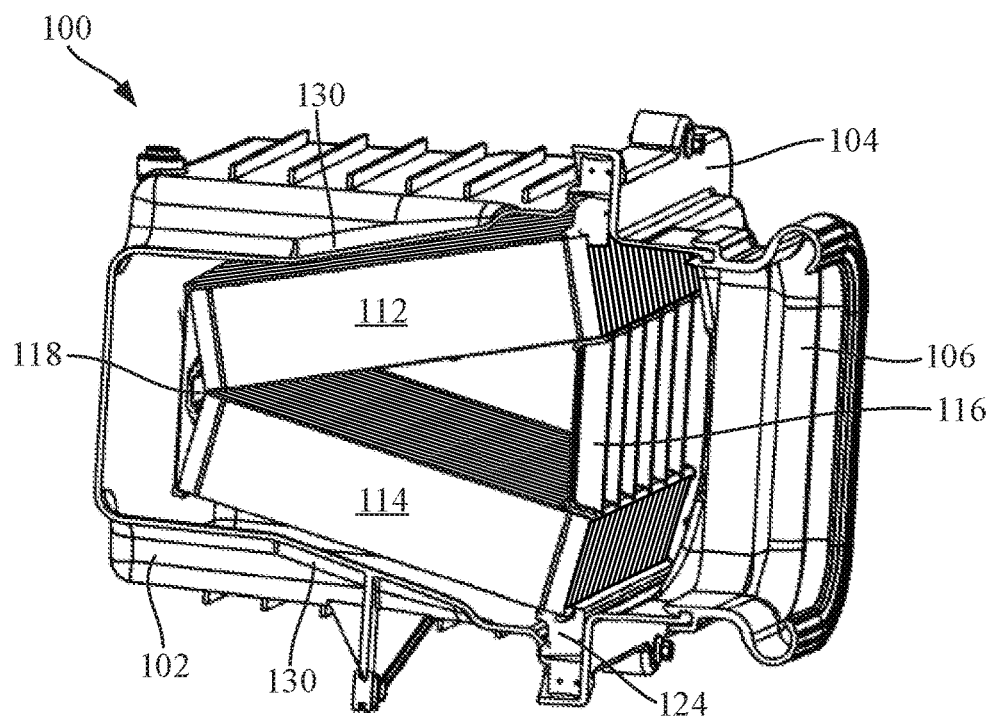
FIG. 2 shows a cross-sectional view of the filtration system of FIG. 1.
Figure 3:
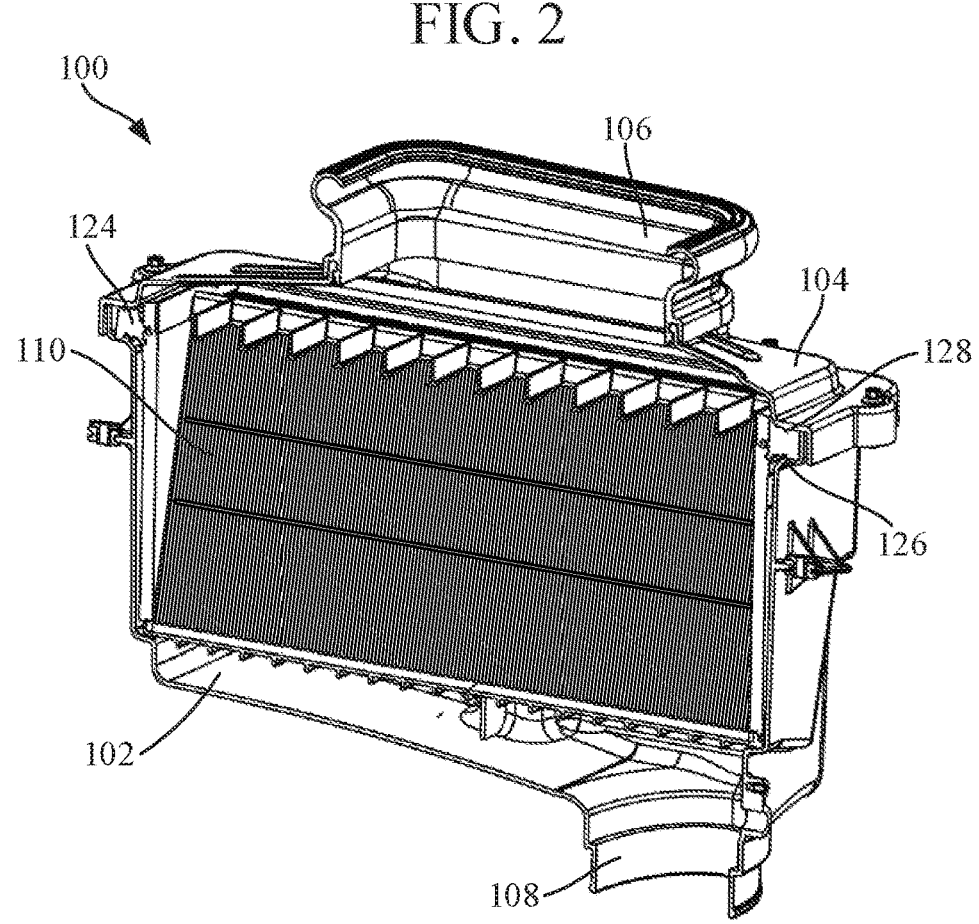
FIG. 3 shows another cross-sectional view of the filtration system of FIG. 1.
Figure 4:
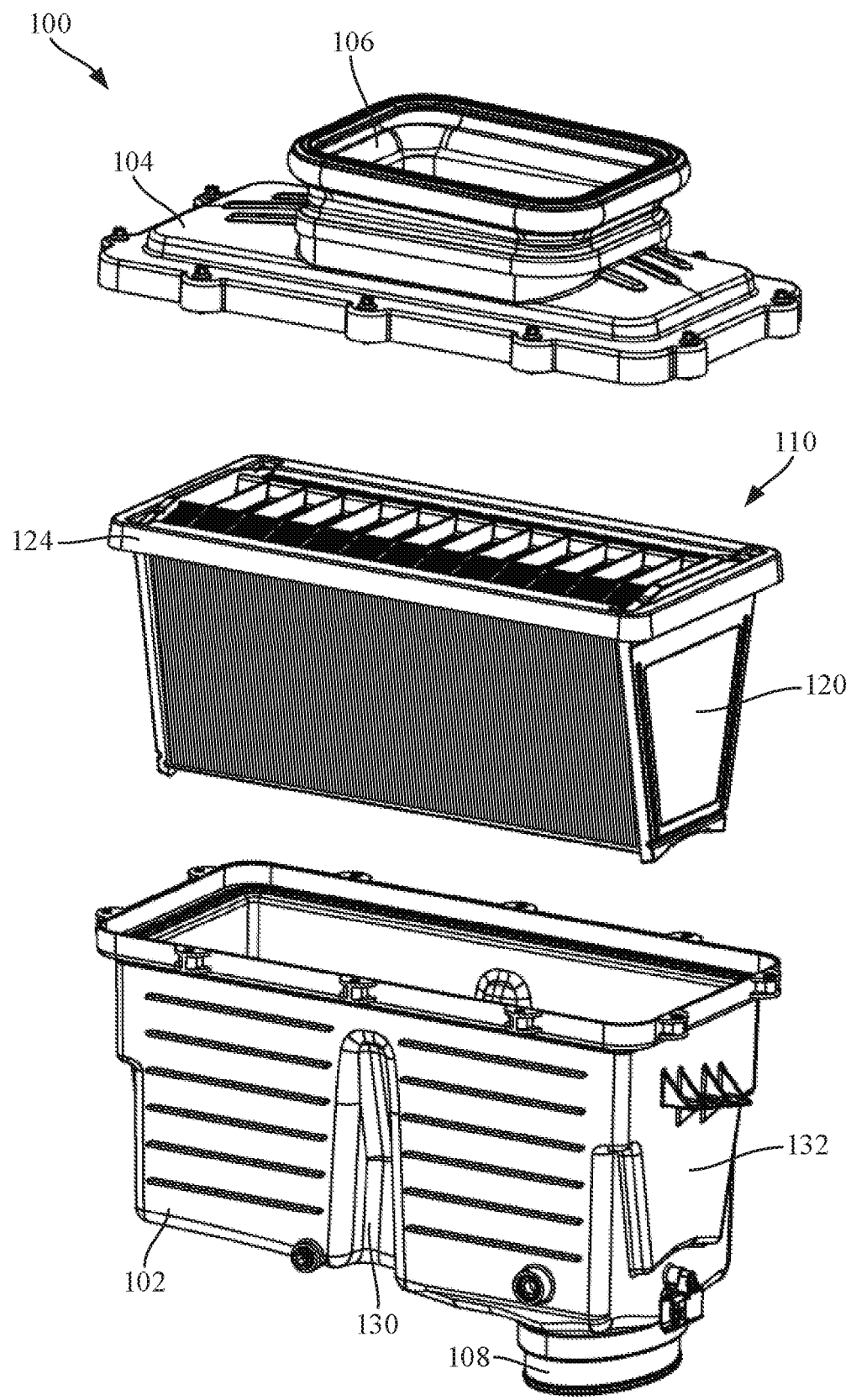
FIG. 4 shows an exploded view of the filtration system of FIG. 1.

Referring to FIG. 1, a perspective view of a filtration system 100 is shown according to an example embodiment. Referring to FIG. 2 and FIG. 3, cross-sectional views of the filtration system 100 are shown. Referring to FIG. 4, an exploded view of the filtration system 100 is shown. The filtration system 100 includes a housing 102 and a cover 104. The cover 104 is removably coupled to the housing 102. The cover 104 may be removably coupled to the housing 102 through fasteners (e.g., screws), clamps, snap fit connections, or a combination thereof. The cover includes an air inlet 106 structured to provide air to be filtered to the filtration system 100. The housing 102 includes an air outlet 108 structured to provide filtered air to a component, such as an internal combustion engine. As shown best in FIGS. 2 through 4, a filter element 110 is removably received within the housing 102 and the cover 104. The filter element 110 has a V-shaped cross section (as shown in FIG. 2).

Referring to FIGS. 5-12, various views of the filter element 110 of the filtration system 100 are shown. The filter element 110 includes first filter media 112 and second filter media 114. In some arrangements, the first filter media 112 and the second filter media 114 are panel filters that form the filter element 110. The first filter media 112 and the second filter media 114 may be the same type of filter media or different filter media. In some arrangements, the first filter media 112 and the second filter media 114 are pleated filter blocks as described in U.S. Pat. No. 6,375,700, entitled "DIRECT FLOW FILTER," which is herein incorporated by reference in its entirety and for all purposes. In some arrangements, the pleat tips of the first and second filter media 112 and 114 are blocked on one end and open on the other end. In other arrangements, the pleat tips are blocked on both ends.

The filter element 110 includes a frame comprising a first frame member 116 and a second frame member 118. The first frame member 116 and the second frame member 118 secure the first filter media 112 and the second filter media 114 into a V-shape (e.g., as shown in FIG. 2). The first frame member 116 and the second frame member 118 provide durability and structure to the filter element 110 and serve as manufacturing fixtures during manufacturing of the filter element 110. The first frame member 116 and the second frame member 118 protect the first and second filter media 112 and 114 during manufacturing and during installation of the filter element 110 into the housing 102. As shown best in FIG. 12, the second frame member 118 wraps around the edge of the first and second filter media 112 and 114 limiting the exposure of the first and second filter media 112 and 114 to come in contact with other objects (e.g., the housing 102 during installation of the filter element 110). The rigidity created by the first and second frames 116 and 118 also improve the aesthetics and durability of the filter element 110. The rigidity helps to prevent the first filter media 112 and the second filter media 114 from collapsing during use and limits the stress on the first filter media 112 and the second filter media 114 during sealing (as described below with respect to the seal member 124). Further the first and second frames 116 and 118 provide a grip area for a technician installing the filter element 110 into the housing 102 or removing an installed filter element 110 from the housing 102.

The first filter media 112 and the second filter media 114 may include any of pleated media, corrugated media, tetrahedral media, or variations thereof. U.S. Pat. No. 8,397,920, entitled "PLEATED FILTER ELEMENT WITH TAPERING BEND LINES," by Moy et al., filed on Oct. 14, 2011, and issued on Mar. 19, 2013, assigned to Cummins Filtration IP Inc., which is incorporated by reference in its entirety and for all purposes, describes a tetrahedral filter media. Some configurations of tetrahedral filter media include a plurality of inlet tetrahedron flow channels and a plurality of outlet tetrahedron flow channels. The inlet tetrahedron merge in a central portion of the filter material, thereby allowing axial cross-flow of air between the inlet tetrahedron channels prior to the air passing through the filter media. Such an arrangement provides for additional dust loading on the upstream side of the media, which increases filter capacity. The tetrahedral flow channels may be stacked, layered, or coiled into various shapes and configurations. For example, the first and second filter media 112 and 114 may have, for example, thirty to eighty stacked layers of tetrahedral flow channels. These stacked layers of tetrahedral flow channels can be arranged to form various shapes. For example, layers of tetrahedral flow channels, the layers having different lengths and/or widths, can be stacked such that the stacked layers of tetrahedral flow channels substantially match the V-shape of the filter element 110 as shown and described. Specific arrangements of such tetrahedral filter media are further described in U.S. Pat. No. 8,397,920.

The filter element 110 includes side walls 120. In some arrangements, the side walls 120 are comprised of urethane. Alternatively, the side walls 120 be comprised of plastisol. In such arrangements, the first filter media 112 and the second filter media 114 may be potted into or overmolded into the side walls 120. For example, a face of a first pleat within the first filter media 112 and a face of a first plate within the second filter media 114 may be potted into one of the side walls 120, and a face of a second pleat within the first filter media 112 and a face of a second plate within the second filter media 114 may be potted into the other of the side walls 120.

Figures 6, 7:
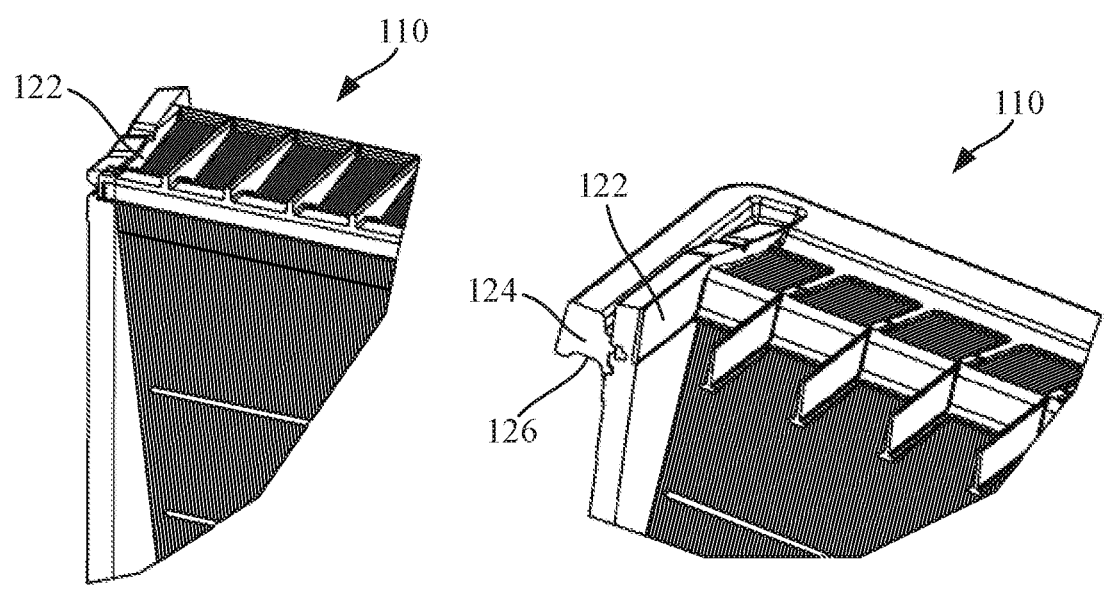
FIGS. 6, 7, 8, 9, 10, 11, and 12 each show a different close-up view of the filter element of the filtration system of FIG. 1.
Figures 9, 10:
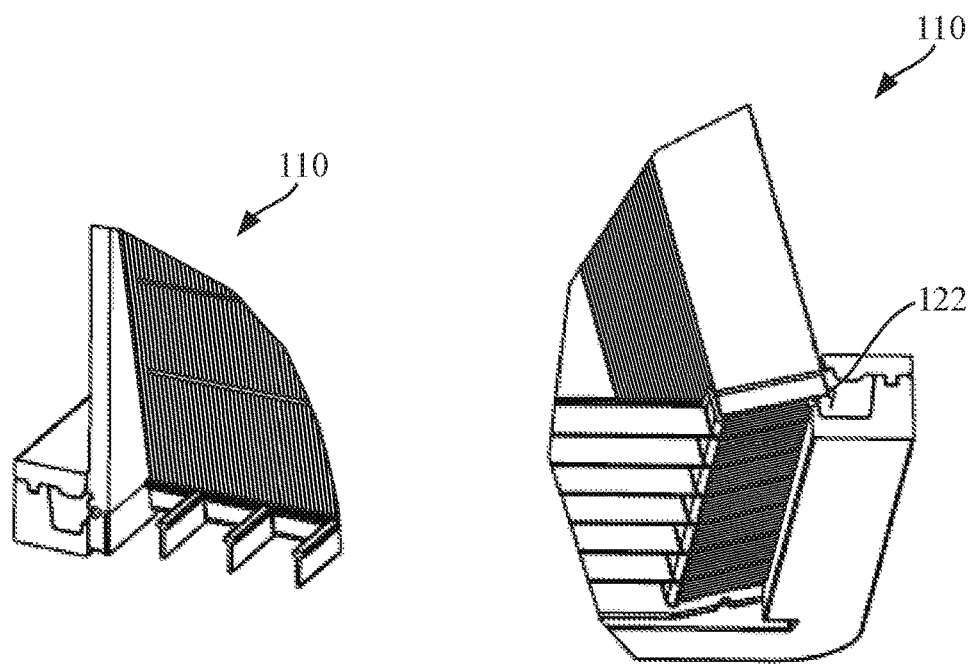
Figure 11:
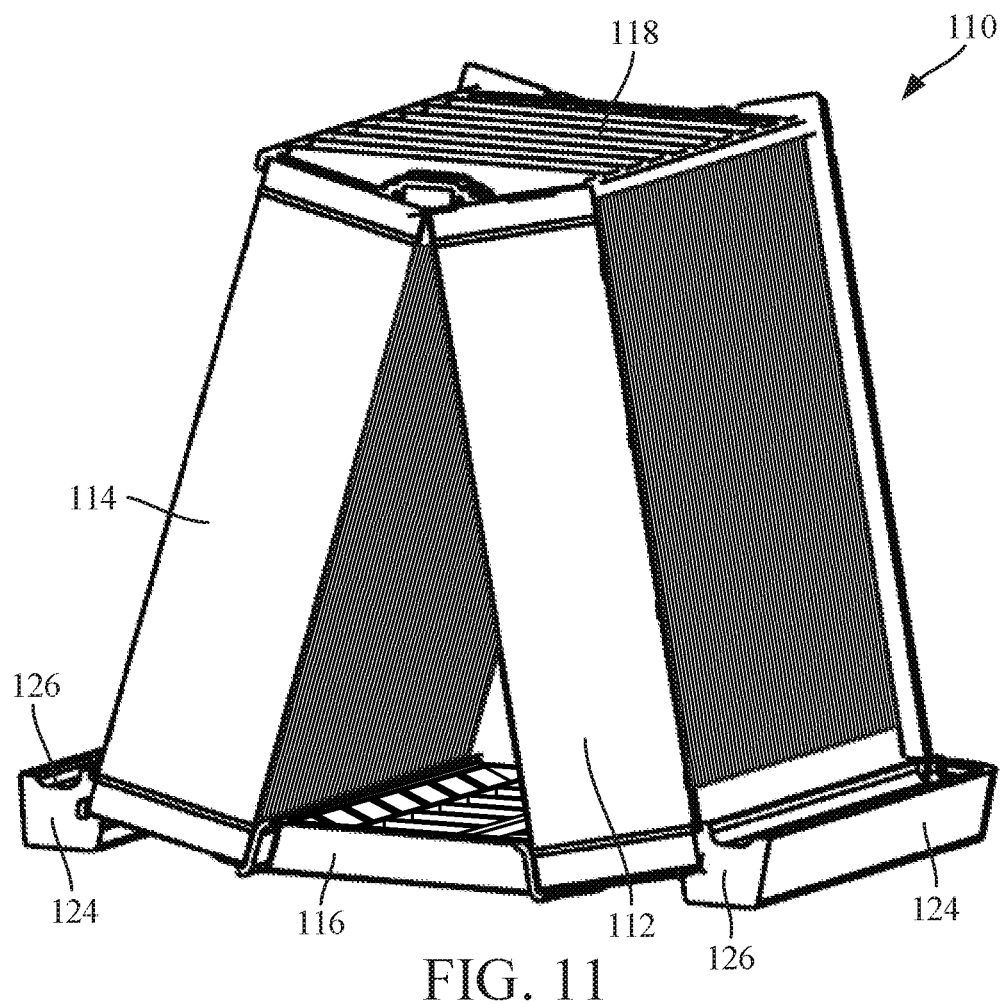
Figure 12:
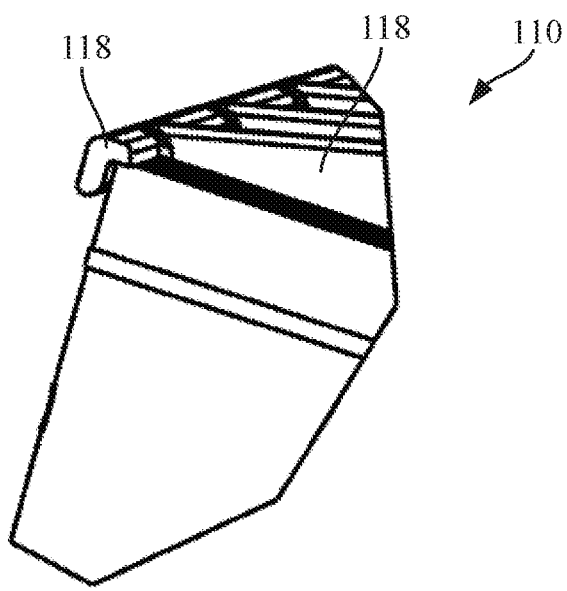

In some arrangements, the side walls 120 each have a trapezoidal shape. In some arrangements, the side walls 120 include a flat surface for receiving a label (e.g., a product label or identifier). The outer perimeter thickness of the side walls 120 is controlled during manufacturing by using a closed mold, which allows for a controlled surface with which to engage during additional manufacturing operations. Additionally, the first and second frames 116 and 118 include urethane shut-off ridges 122 that prevent the urethane forming the side walls 120 from over-expanding and blow (as shown in FIGS. 6, 7, and 10). The tapered shape of the filter element 110 allows for improved filter alignment and serviceability.

Figure 5:
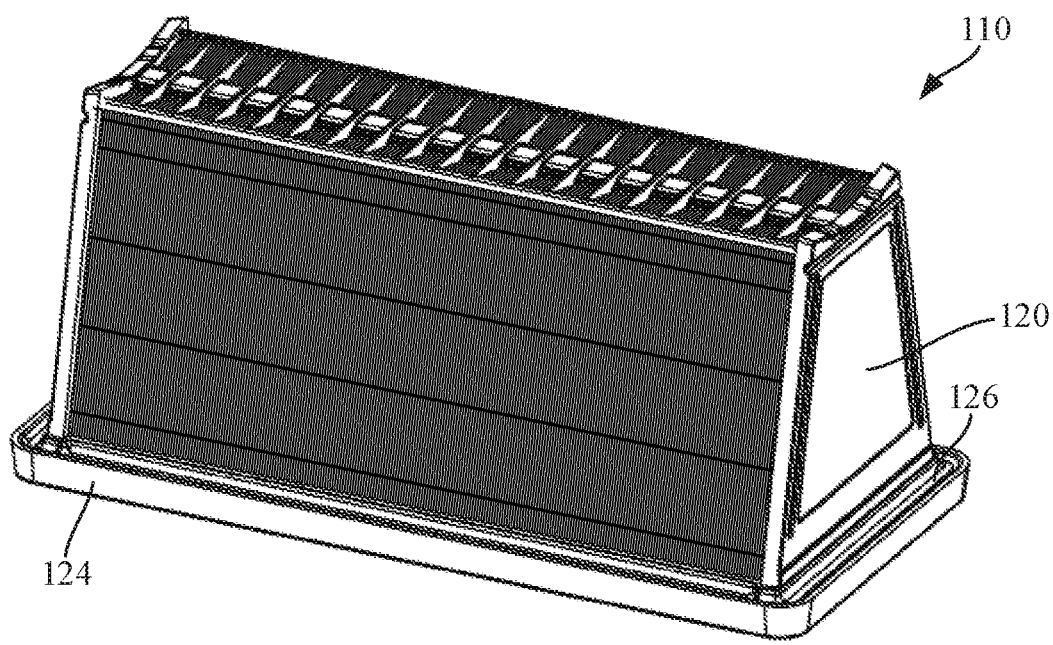
FIG. 5 shows a perspective view of the filter element of the filtration system of FIG. 1.
Figure 8:
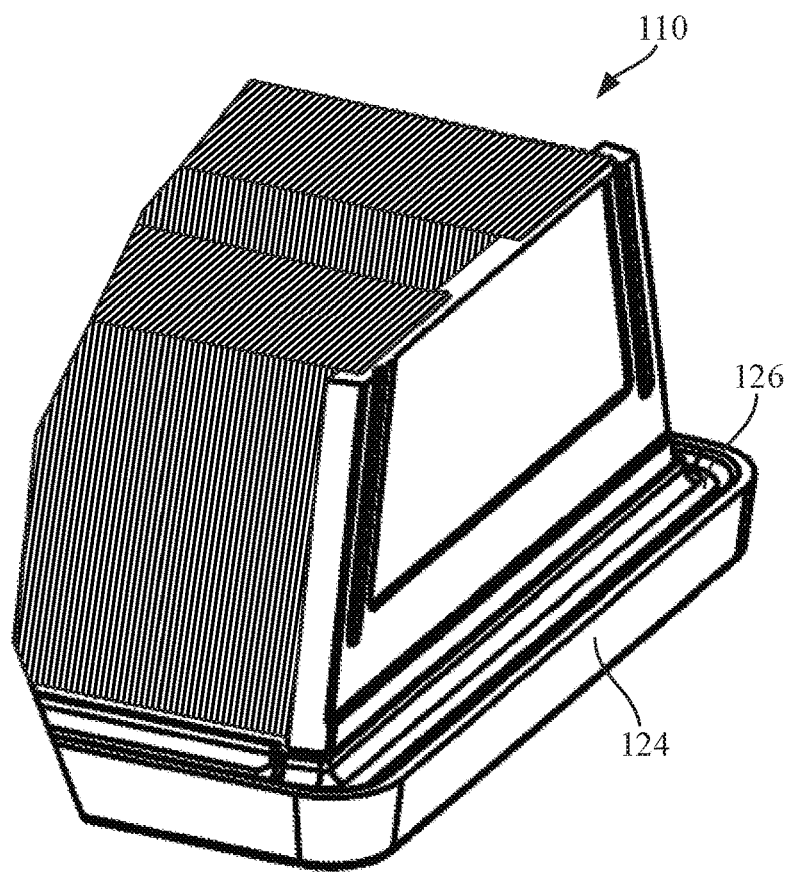

The filter element 110 includes a seal member 124. As shown in FIG. 3, when the filter element 110 is installed in the housing 102, the seal member 124 is compressed by the cover 104 against the housing 102 and forms an axial seal with the housing 102. In some arrangements, the seal member 124 is urethane. In such arrangements, the seal member 124 may be overmolded over the first frame member 116 and the side walls 120. The axial seal prevents air entering the filtration system 100 through the inlet 106 from bypassing the filter element 110. As shown in FIGS. 5, 7, and 8, the seal member 124 includes a U-shaped channel 126. The U-shaped channel 126 receives a ridge of the housing 102 (as shown in FIG. 3). The interaction between the U-shaped channel 126 and the ridge helps to align the filter element 110 during installation of the filter element 110 into the housing 102. During installation, when the cover 104 is secured to the housing 102, a ridge 128 on the cover 104 presses into the seal member 124 to help form the axial seal.

In some arrangements, the seal member 124 does not include a U-shaped channel. According to some embodiments, the seal member 124 has a stepped geometry. In these embodiments, the seal member 124 may provide multiple sealing faces that interface with the cover 104. The top and/or bottom of the seal member 124 may be stepped in this fashion such that the seal member 124 may be tailored for a target application.

Figure 13:
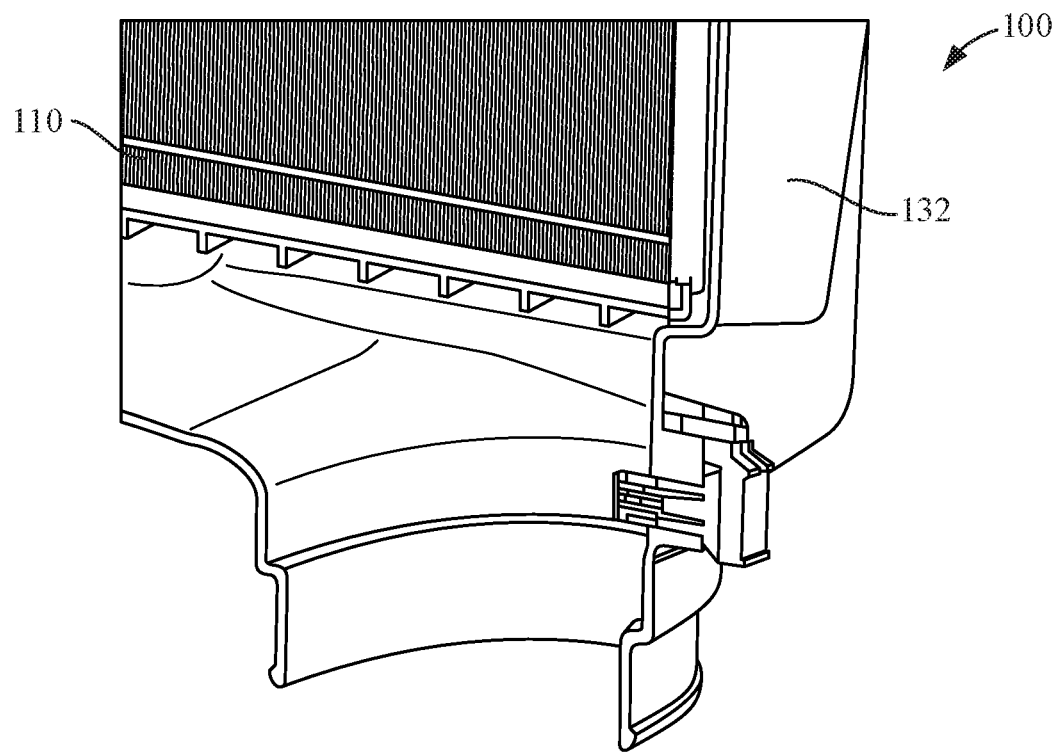
FIG. 13 shows a cross-sectional view of the filter element installed in the housing of the filtration system of FIG. 1.
Figure 14:
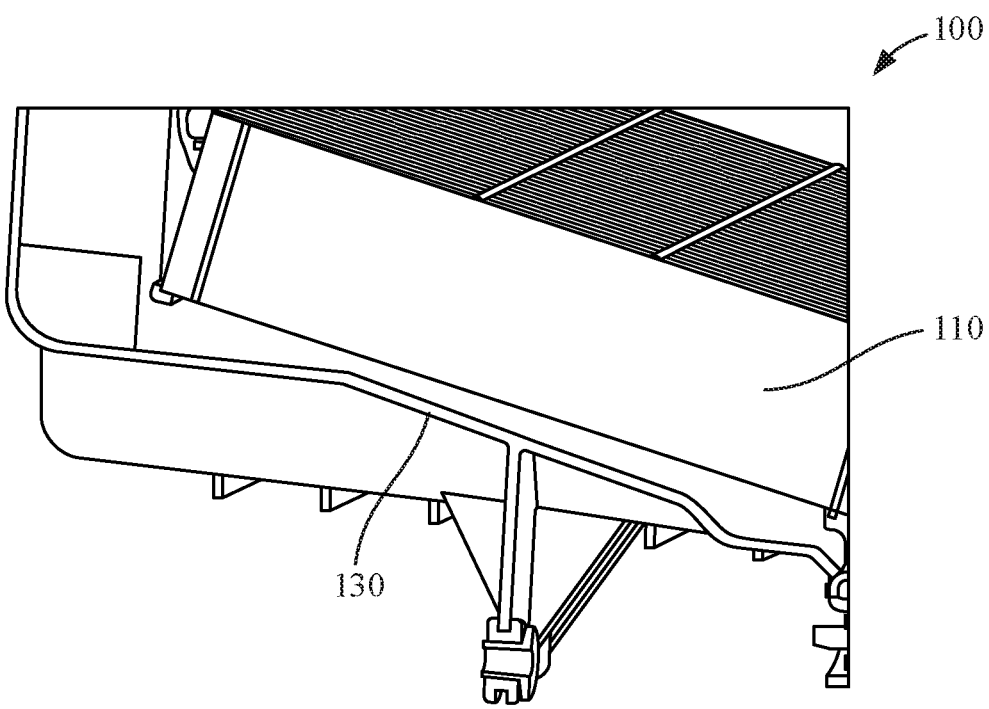
FIG. 14 shows another cross-sectional view of the filter element installed in the housing of the filtration system of FIG. 1.

Referring again to FIG. 4, the housing 102 includes a keyway 130 that receives and guides the filter element 110 during installation of the filter element into the housing 102. The keyway allows the filter element 110 and the housing 102 to nest together. The keyway 130 is structured to function as a support surface that generally limits the amount of movement of the filter element 110 within the housing, thereby limiting the strain on the filter element 110 caused by vibration or heavy loading on the filter element 110 during operation of the filtration system 100. The keyway 130 also prevents the filter element 110 from sagging during horizontal configurations of the filter element. In some arrangements, the keyway 130 is angled to match the angle of the V-shape of the filter element 110. In further arrangements, the keyway 130 includes an internal rib that provides a positive stop to limit movement of the filter element 110 during installation. In some arrangements, the housing also includes a side-support keyway 132 that supports the side of the filter element 110 within the housing 102 (e.g., as shown in FIG. 4). In such arrangements, the side-support keyway 132 is angled to match the V-shaped contour of the side walls 120 of the filter element 110. The interaction of the filter element 110 with the keyway 130 and the side-support keyway 132 are shown in FIGS. 13 and 14.

Figure 15:
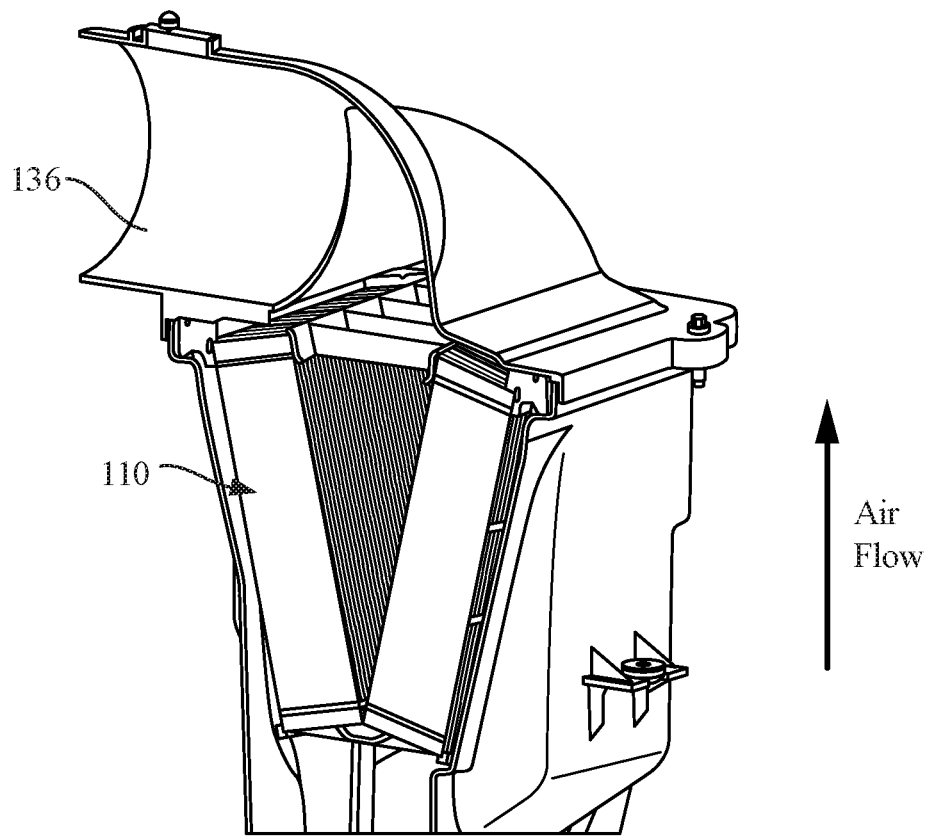
FIGS. 15 and 16 each show a cross-sectional view of a filtration system having the air flow direction reversed compared to the filtration system of FIG. 1.
Figure 16:
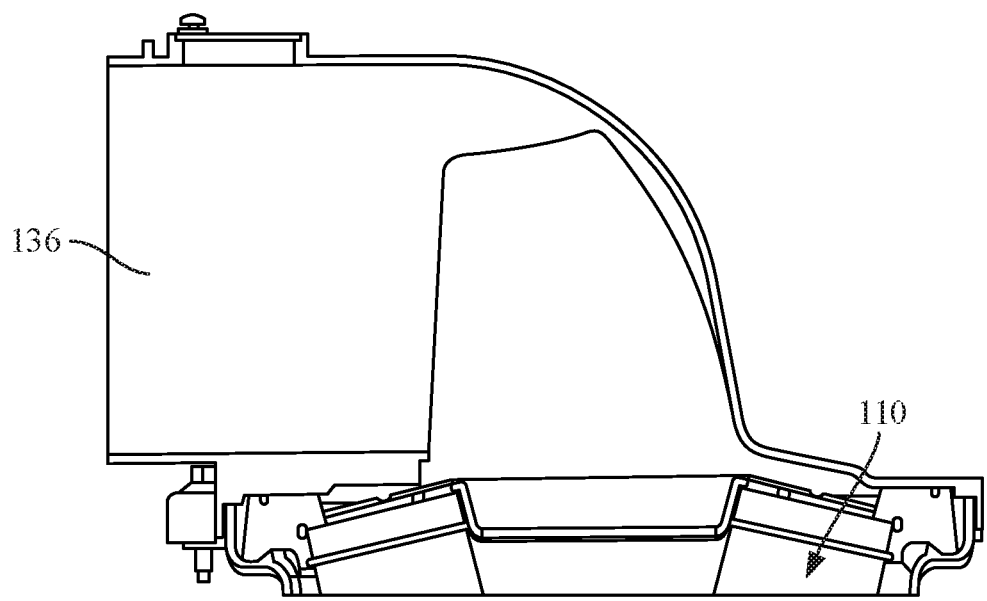
Figure 17:
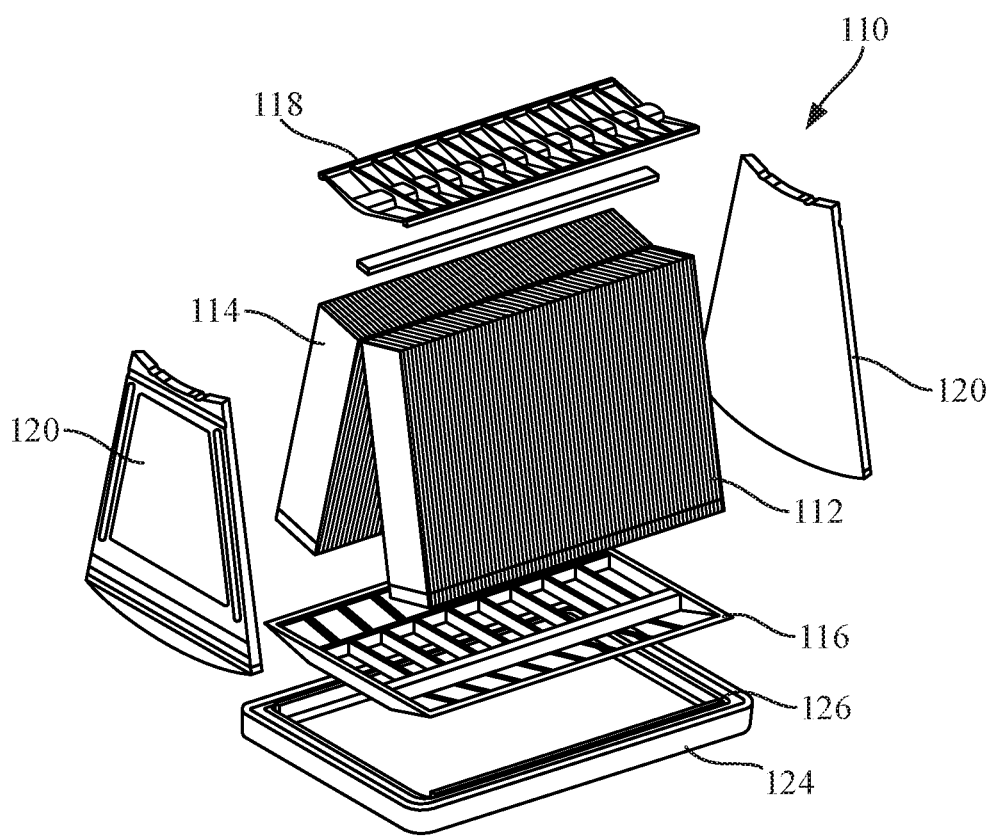
FIG. 17 shows an exploded view of the filter element of the filtration system of FIG. 1.
Figure 18:
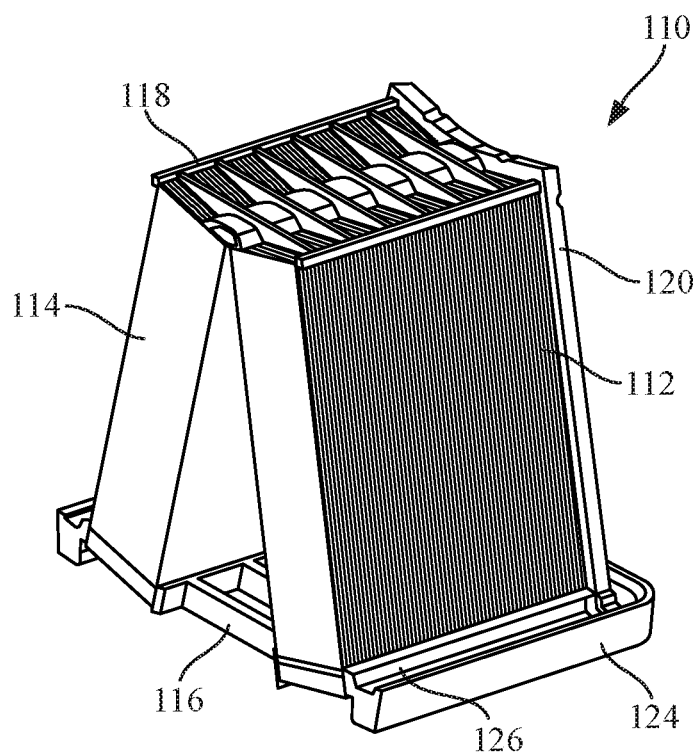
FIG. 18 shows a cross-sectional view of the filter element of the filtration system of FIG. 1.
Figure 19:
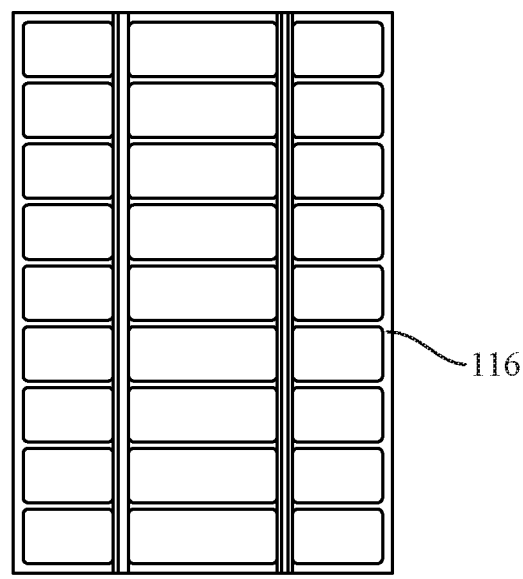
FIG. 19 shows a top view of a first frame of the filter element of the filtration system of FIG. 1.
Figure 20:
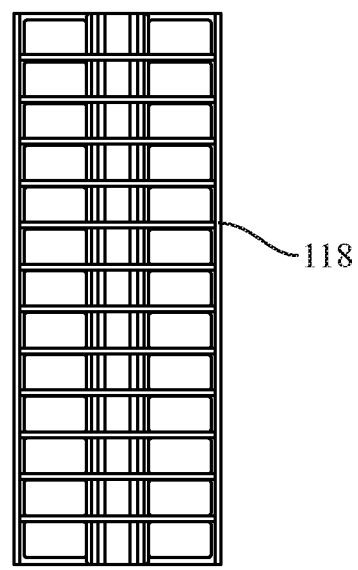
FIG. 20 shows a top view of a second frame of the filter element of the filtration system of FIG. 1.
Figure 21:
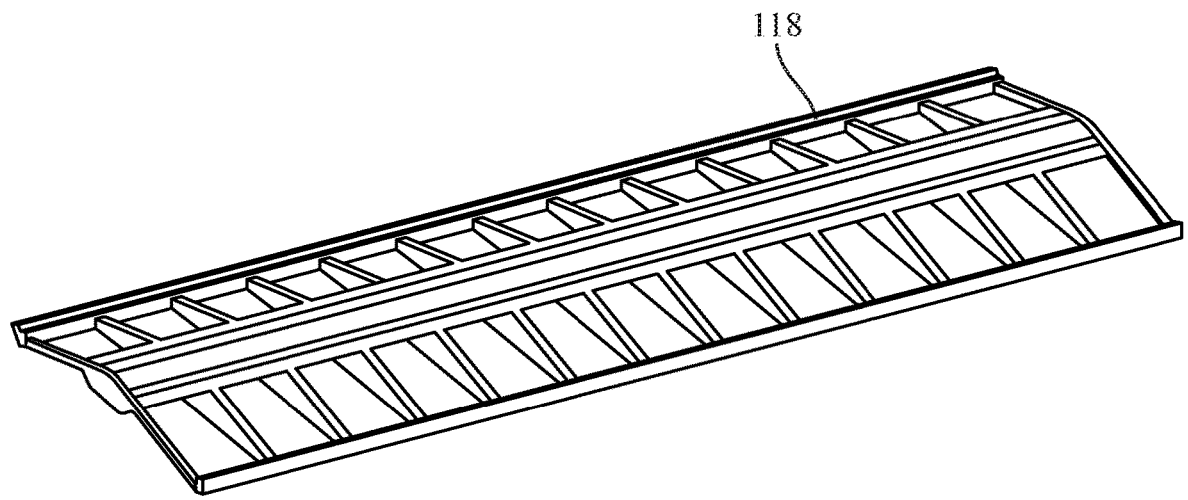
FIG. 21 shows a perspective view of the second frame of FIG. 20.
Figure 22:
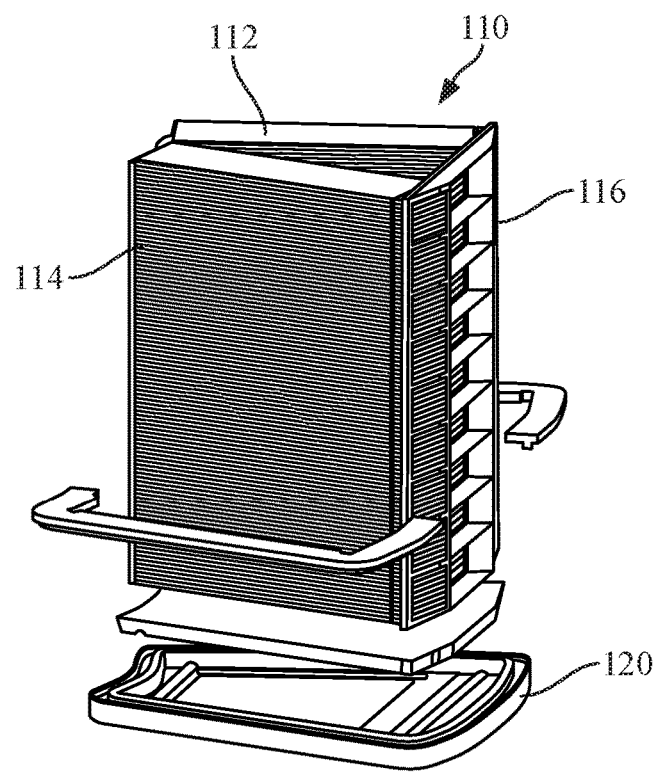
FIG. 22 shows an exploded view of the filter element of the filtration system of FIG. 1 during manufacturing.
Figure 23:
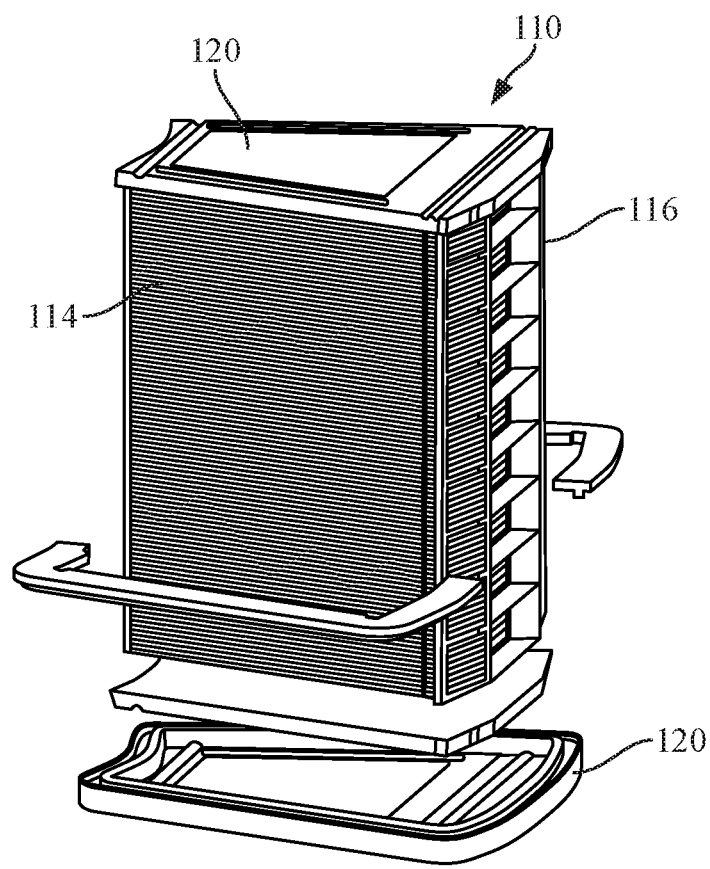
FIG. 23 shows another exploded view of the filter element of the filtration system of FIG. 1 during manufacturing.
Figure 24:
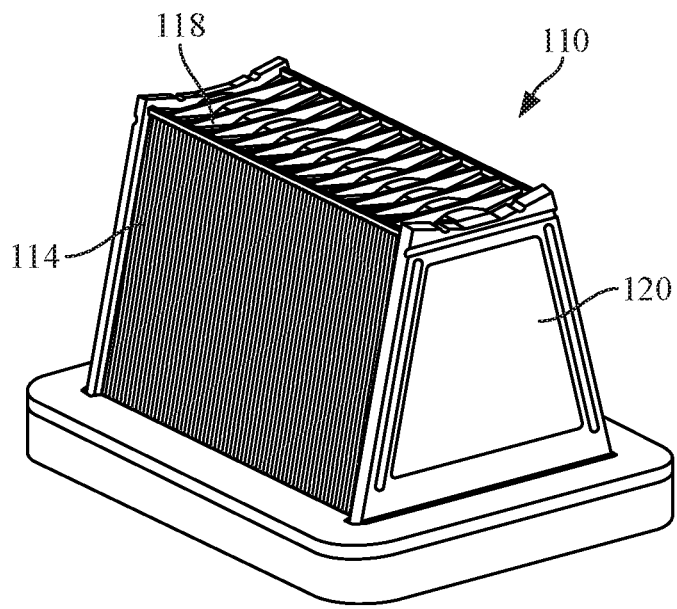
FIG. 24 shows a perspective view of the filter element of the filtration system of FIG. 1 during manufacturing.
Figure 25:
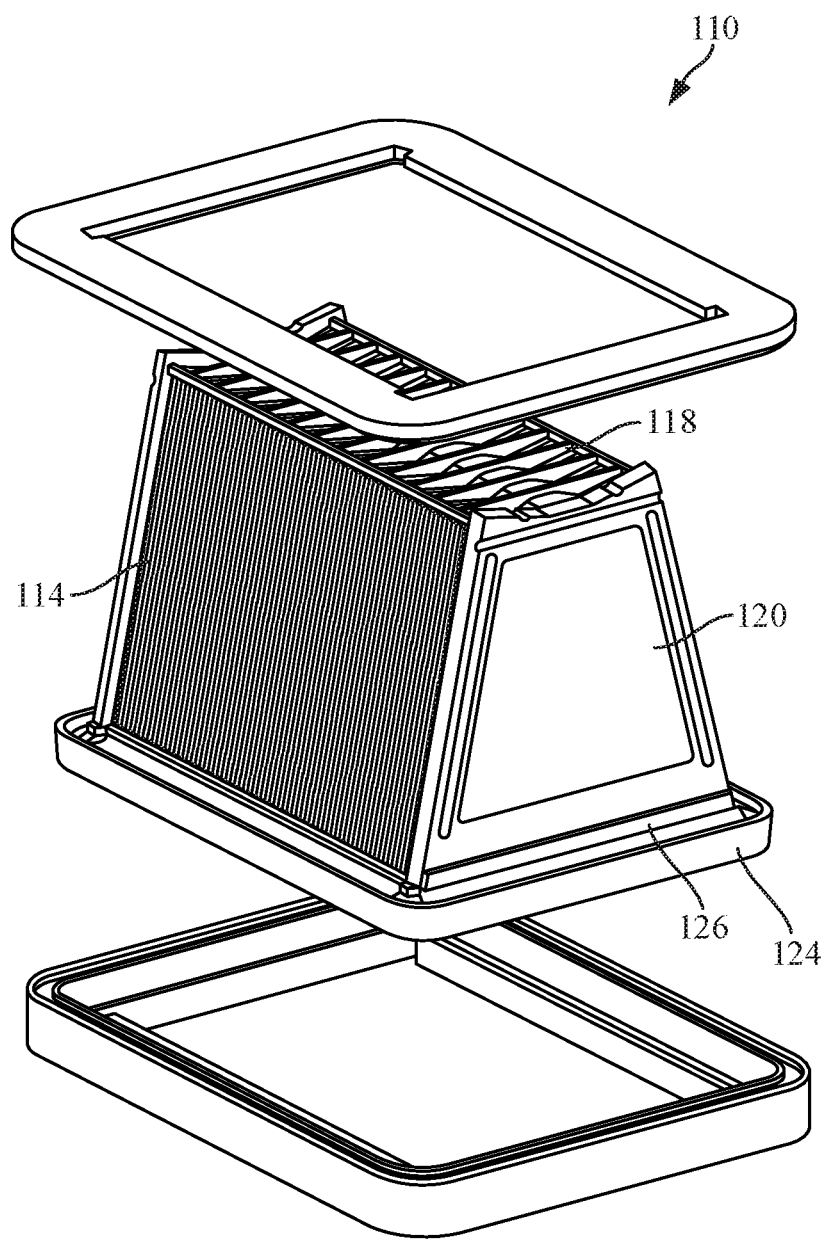
FIG. 25 shows an exploded view of the filter element of the filtration system of FIG. 1 during manufacturing.

During operation of the filtration system 100, air to be filtered enters in through the inlet 106 and passes into the central area of the V-shape formed between the first filter media 112 and the second filter media 114 through the supports of the first frame member 116. The air then passes through the first filter media 112 and the second filter media 114, where the first filter media 112 and the second filter media 114 removes and captures contaminants in the air (e.g., dust, dirt, moisture, etc.). The filtered air then exits the housing 102 through the outlet 108. Accordingly, the air flows in a general air flow direction designated by arrow 134 of FIG. 1. When the filter element 110 is replaced, the V-shaped pocket formed between the first filter media 112, the second filter media 114, and the two side walls 120 contains all of the captured contaminants thereby resulting in a clean filter cartridge service. In an alternative arrangement, the filtration system 100 is structured to have airflow move in the opposite direction. Such an arrangement is shown in FIGS. 15 and 16. In such an arrangement, the cover 104 may be fitted with an outlet hood 136. In either arrangement, the cover 104 can be formed to receive and/or distribute the air directly from the open area between the first filter media 112 and the second filter media 114 thereby improving the flow characteristics of the system.

FIGS. 17 through 25 show additional views of the filtration system 100 and its components. As shown specifically in FIG. 17, the second frame member 118 may receive a single urethane seal. In this way, a de-molding operation may not be required when assembling filter element 110. The single urethane seal may contact both the first filter media 112 and the second filter media 114.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filter element comprising:
   first filter media;
   second filter media;
   a frame coupled to the first filter media and the second filter media; and
   a seal member attached to and extending from the frame, the seal member including a U-shaped channel structured to receive a ridge of a housing when the filter element is installed in the housing, the seal member structured to form a seal between the filter element and the housing when the filter element is installed in the housing.

2. The filter element of claim 1, wherein the frame secures the first filter media and the second filter media into a V-shape; and
   wherein the frame comprises:
   a first frame member coupled to a first end of the first filter media and a first end of the second filter media; and
   a second frame member coupled to a second end of the first filter media, opposite the first end of the first filter media, and a second end of the second filter media, opposite the first end of the second filter media.

3. The filter element of claim 2, wherein the frame further comprises:
   a first side wall positioned along a first side of the first filter media and a first side of the second filter media, the first side wall coupled to the first frame member and the second frame member; and
   a second side wall positioned along a second side of the first filter media, opposite the first side of the first filter media, and a second side of the second filter media, opposite the first side of the second filter media.

4. The filter element of claim 3, wherein the first side wall is disposed along a first plane and the second side wall is disposed along a second plane; the first plane substantially parallel to the second plane.

5. The filter element of claim 4, wherein the first side wall and the second side wall are both trapezoidal in shape.

6. The filter element of claim 3, wherein the first filter media and the second filter media are contained within the frame.

7. The filter element of claim 3, wherein the first frame member is defined by a first perimeter;
   wherein the second frame member is defined by a second perimeter less than the first perimeter; and
   wherein the seal member is attached to, and extends from, the first frame member.

8. The filter element of claim 7, wherein the filter element is oriented within the housing such that air enters the filter element through the first frame member.

9. The filter element of claim 7, wherein the filter element is oriented within the housing such that air enters the filter element through the second frame member.

10. The filter element of claim 3, wherein the first filter media and the second filter media are potted into the first side wall; and
    wherein the first filter media and the second filter media are potted into the second side wall.

11. A filtration system comprising:
    a housing comprising an outer wall and a keyway that is coupled to the outer wall; and
    a filter element positioned within the housing, the filter element comprising:
    first filter media panel;
    second filter media panel; and
    a frame coupled to the first filter media panel and the second filter media panel;
    wherein the keyway interfaces with the first filter media panel to facilitate positioning of the filter element within the housing, and wherein the keyway is oriented parallel to and offset from the first filter media panel when the filter element is installed within the housing.

12. The filtration system of claim 11, wherein the filter element further comprises a seal member attached to and extending from the frame, the seal member including a U-shaped channel structured to receive a ridge of the housing.

13. The filtration system of claim 12, further comprising a cover removably coupled to the housing, the cover configured to selectively cover the filter element within the housing, the cover compressing the seal member such that a seal is formed between the filter element, the housing, and the cover.

14. The filtration system of claim 11, wherein the frame secures the first filter media and the second filter media into a V-shape; and
    wherein the frame comprises:
    a first frame member coupled to a first end of the first filter media and a first end of the second filter media; and
    a second frame member coupled to a second end of the first filter media, opposite the first end of the first filter media, and a second end of the second filter media, opposite the first end of the second filter media.

15. The filtration system of claim 14, wherein the frame further comprises:
    a first side wall positioned along a first side of the first filter media and a first side of the second filter media, the first side wall coupled to the first frame member and the second frame member, the first side wall having a V-shape contour; and
    a second side wall positioned along a second side of the first filter media, opposite the first side of the first filter media, and a second side of the second filter media, opposite the first side of the second filter media, the second side wall having a V-shape contour.

16. The filtration system of claim 15, wherein the housing further comprises:
    a first side-support keyway that interfaces with the first side wall to support the first side wall within the housing, the first side-support keyway being angled to match the V shape contour of the first side wall; and
    a second side-support keyway that interfaces with the second side wall to support the second side wall within the housing, the second side-support keyway being angled to match the V-shape contour of the second side wall.

17. A filter element comprising:
    first filter media;
    second filter media; and
    a frame coupled to the first filter media and the second filter media, the frame securing the first filter media and the second filter media, the frame comprising:
    a first frame member coupled to a first end of the first filter media and a first end of the second filter media, the first frame member defining a first opening and a first perimeter surrounding the first opening;

a second frame member coupled to a second end of the first filter media, opposite the first end of the first filter media, and a second end of the second filter media, opposite the first end of the second filter media, the second frame member defining a second opening and a second perimeter surrounding the second opening, the second perimeter less than the first perimeter;

a first side wall positioned along a first side of the first filter media and a first side of the second filter media, the first side wall coupled to the first frame member and the second frame member; and a second side wall positioned along a second side of the first filter media, opposite the first side of the first filter media, and a second side of the second filter media, opposite the first side of the second filter media.

18. The filter element of claim 17, wherein the first side wall is disposed along a first plane and the second side wall is disposed along a second plane; the first plane substantially parallel to the second plane.

19. The filter element of claim 17, wherein the first side wall and the second side wall are both trapezoidal in shape.

20. The filter element of claim 17, wherein the first filter media and the second filter media are contained within the frame.

21. The filter element of claim 17, further comprising a seal member;
wherein the seal member is attached to, and extends from, the first frame member.

22. The filter element of claim 21, wherein the filter element is oriented such that air enters the filter element through the first frame member and at least partially exits the filter element through the second frame member.

23. The filter element of claim 21, wherein the filter element is oriented such that air enters the filter element through the second frame member and at least partially exits the filter element through the first frame member.

24. The filter element of claim 17, wherein the first filter media and the second filter media are potted into the first side wall; and
wherein the first filter media and the second filter media are potted into the second side wall.

25. The filter element of claim 17, wherein the frame secures the first filter media and the second filter media into a V-shape.

* * * * *